(12) United States Patent
Guo et al.

(10) Patent No.: US 12,375,255 B2
(45) Date of Patent: Jul. 29, 2025

(54) INTERFERENCE COORDINATION METHOD AND APPARATUS

(71) Applicant: Huawei Technologies Co., Ltd., Shenzhen (CN)

(72) Inventors: Zhaoyang Guo, Dongguan (CN); Bo Xie, Dongguan (CN); Wei Zhao, Dongguan (CN); Jibin Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 401 days.

(21) Appl. No.: 18/146,815

(22) Filed: Dec. 27, 2022

(65) Prior Publication Data

US 2023/0127897 A1    Apr. 27, 2023

Related U.S. Application Data

(63) Continuation of application No. PCT/CN2021/101912, filed on Jun. 23, 2021.

(30) Foreign Application Priority Data

Jun. 28, 2020   (CN) .......................... 202010599231.4

(51) Int. Cl.
*H04L 5/14* (2006.01)
*H04W 72/0446* (2023.01)
(Continued)

(52) U.S. Cl.
CPC ....... *H04L 5/1469* (2013.01); *H04W 72/0446* (2013.01); *H04W 72/0453* (2013.01); *H04W 72/541* (2023.01)

(58) Field of Classification Search
CPC .............. H04L 5/1469; H04W 72/541; H04W 72/0446; H04W 72/0453
See application file for complete search history.

(56) References Cited

U.S. PATENT DOCUMENTS 10,609,681 B2 *   3/2020   Wang .................. H04W 72/542
10,849,131 B2 *   11/2020  Chendamarai Kannan .................
                                                          H04B 7/0695
(Continued)

FOREIGN PATENT DOCUMENTS

CA          2869930 A1      11/2013
CN       101835162 A         9/2010
(Continued)

*Primary Examiner* — Bailor C Hsu
(74) *Attorney, Agent, or Firm* — Slater Matsil, LLP

(57) ABSTRACT

Embodiments of this application disclose an interference coordination method and an apparatus. The method includes: A first TDD system and a second TDD system are adjacent asynchronous TDD systems of each other, the first TDD system communicates with UE in a first slot by using a first specified frequency domain resource, and the second TDD system communicates with the UE in a second slot by using a second specified frequency domain resource, where the first specified frequency domain resource is different from the second specified frequency domain resource. Alternatively, the first TDD system modifies a slot configuration of a third slot corresponding to the first slot when communicating with the UE in the first slot, and the second TDD system modifies a slot configuration of a fourth slot corresponding to the second slot when communicating with the UE in the second slot. The first slot and the second slot have same time domain positions and different functions.

20 Claims, 7 Drawing Sheets

(51) Int. Cl.
*H04W 72/0453* (2023.01)
*H04W 72/541* (2023.01)

(56) References Cited

U.S. PATENT DOCUMENTS

| | | | |
|---|---|---|---|
| 10,924,250 B2 * | 2/2021 | Papasakellariou | H04L 5/0098 |
| 11,032,828 B2 * | 6/2021 | Nam | H04W 76/27 |
| 11,166,184 B2 * | 11/2021 | Papaleo | H04W 24/10 |
| 11,330,575 B2 * | 5/2022 | Lin | H04L 1/0026 |
| 11,664,962 B2 * | 5/2023 | Abotabl | H04W 72/23 370/280 |
| 11,838,778 B2 * | 12/2023 | Zhang | H04L 5/0057 |
| 11,937,235 B2 * | 3/2024 | Lei | H04L 1/08 |
| 12,052,579 B2 * | 7/2024 | Shen | H04W 16/14 |
| 12,213,164 B2 * | 1/2025 | Xiao | H04L 5/0098 |
| 2013/0121189 A1 | 5/2013 | Bhattad et al. | |
| 2013/0272170 A1 | 10/2013 | Chatterjee et al. | |
| 2013/0329612 A1 | 12/2013 | Seo et al. | |
| 2015/0189666 A1 | 7/2015 | Wang et al. | |
| 2015/0245246 A1 | 8/2015 | Golitschek Edler Von Elbwart | |
| 2015/0326378 A1 | 11/2015 | Zhang et al. | |
| 2016/0020953 A1 | 1/2016 | Zhu et al. | |
| 2016/0242054 A1 | 8/2016 | Lee et al. | |
| 2023/0209462 A1 * | 6/2023 | Tsai | H04W 52/0235 370/311 |

FOREIGN PATENT DOCUMENTS

| | | |
|---|---|---|
| CN | 102457972 A | 5/2012 |
| CN | 102905372 A | 1/2013 |
| CN | 103391168 A | 11/2013 |
| CN | 103460779 A | 12/2013 |
| CN | 104106233 A | 10/2014 |
| CN | 104885501 A | 9/2015 |
| EP | 2234292 A1 | 9/2010 |
| EP | 2946496 A1 | 11/2015 |

* cited by examiner

A network device in a first TDD system communicates with user equipment UE in a first slot in a first radio frame by using a first specified frequency domain resource, and the network device in the first TDD system communicates with the UE in slots in the first radio frame other than the first slot by using the first frequency domain resource

401

When communicating with UE in a first slot in a first radio frame, a network device in a first TDD system skips scheduling a logical channel in the first slot or a symbol in the first slot, and modifies a slot configuration of a third slot corresponding to the first slot, where a modified slot configuration of the third slot is different from a first slot configuration — 501

The network device in the first TDD system communicates with the UE in other slots by using the first slot configuration, where the other slots are slots in the first radio frame other than the first slot and the third slot — 502

FIG. 5

A network device in a first TDD system receives, in a first radio frame, a first characteristic sequence sent by a network device in a second TDD system — 5011

The network device in the first TDD system monitors, based on device information and an interference management reference signal, an average interference value corresponding to the first characteristic sequence — 5012

When the average interference value corresponding to the first characteristic sequence detected by the network device in the first TDD system is greater than a first threshold, and when communicating with UE in a first slot in a first radio frame, the network device in the first TDD system skips scheduling a logical channel in the first slot or a symbol in the first slot, and modifies a slot configuration of a third slot corresponding to the first slot, where a modified slot configuration of the third slot is different from a first slot configuration — 5013

FIG. 5a

INTERFERENCE COORDINATION METHOD AND APPARATUS

CROSS-REFERENCE TO RELATED APPLICATIONS

This application is a continuation of International Application No. PCT/CN2021/101912, filed on Jun. 23, 2021, which claims priority to Chinese Patent Application No. 202010599231.4, filed on Jun. 28, 2020. The disclosures of the aforementioned applications are hereby incorporated by reference in their entireties.

TECHNICAL FIELD

Embodiments of this application relate to the communications field, and in particular, to an interference coordination method and an apparatus.

BACKGROUND

In a communication system in a time division duplex (TDD) mode (TDD system for short in this specification), UL (uplink) and DL (downlink) use different slots at a same frequency. The TDD system may dynamically or semi-statically configure slot assignments based on service types to meet different uplink-downlink asymmetric service requirements. The slot assignment refers to a ratio of slots that are in a radio frame and that are used to transmit uplink service data and downlink service data.

In a scenario in which neighboring countries or regions use a same frequency band or frequency bands close to each other, if a first TDD system and a second TDD system are neighboring systems, and a slot assignment of the first TDD system is different from a slot assignment of the second TDD system, the first TDD system and the second TDD system are referred to as neighboring asynchronous TDD systems of each other. Because the slot assignment of the first TDD system is different from the slot assignment of the second TDD system, the first TDD system transmits uplink service data in some slots (for example, a first slot), and the second TDD system transmits downlink service data in these slots. Consequently, interference is generated when the first TDD system transmits the uplink service data and the second TDD system transmits the downlink service data in the first slot.

To avoid the interference caused by uplink and downlink scheduling between the first TDD system and the second TDD system due to different slot assignments, in a current technology, each TDD system uses a different frequency domain resource at a geographical boundary of the first TDD system and the second TDD system to avoid interference. For example, the first TDD system uses a part of spectrum bandwidth (for example, the first TDD system uses 60 M in a spectrum bandwidth of 100 M) as a resource for use, and the second TDD system uses another part of spectrum bandwidth (for example, the second TDD system uses the remaining 40 M in the spectrum bandwidth of 100 M) as a resource for use. In this way, because each TDD system can use only a part of spectrum resources, an available spectrum bandwidth is reduced, and utilization of a spectrum bandwidth of each TDD system is low.

SUMMARY

Embodiments of this application provide an interference coordination method, an apparatus, and a system, to avoid interference and improve spectrum bandwidth utilization.

To achieve the foregoing objectives, the following technical solutions are used in embodiments of this application.

According to a first aspect in embodiments of this application, an interference coordination method is provided. The method is applied to a communication system including a first TDD system and a second TDD system. The method includes: The first TDD system uses a first frequency domain resource, the second TDD system uses a second frequency domain resource, and at least a part of frequency domain resources in the first frequency domain resource and a part of frequency domain resources in the second frequency domain resource are the same, and the method includes: A network device in the first TDD system communicates with user equipment UE in a first slot in a first radio frame by using a first specified frequency domain resource, and the network device in the first TDD system communicates with the UE in slots in the first radio frame other than the first slot by using the first frequency domain resource. The first specified frequency domain resource belongs to the first frequency domain resource, the first specified frequency domain resource is different from a second specified frequency domain resource, the second specified frequency domain resource is a frequency domain resource used by a network device in the second TDD system to communicate with the UE in a second slot in a second radio frame, the second specified frequency domain resource belongs to the second frequency domain resource, a time domain position of the second slot in the second radio frame is the same as a time domain position of the first slot in the first radio frame, and the second slot and the first slot have different functions. In this embodiment of this application, the network device in the first TDD system communicates with the user equipment UE in the first slot in the first radio frame by using the first specified frequency domain resource, to effectively avoid the interference between the first TDD system and the second TDD system. In addition, the network device in the first TDD system communicates with the UE in slots in the first radio frame other than the first slot by using the first frequency domain resource, to effectively improve spectrum bandwidth utilization. Therefore, this embodiment of this application can avoid interference and improve spectrum bandwidth utilization.

Based on the method according to the first aspect, that the second slot and the first slot have different functions is specifically as follows: The first slot is used by the network device in the first TDD system to receive, in the first slot, an uplink signal sent by the UE, and the second slot is used by the network device in the second TDD system to send a downlink signal to the UE in the second slot; or the first slot is used by the network device in the first TDD system to send a downlink signal to the UE in the first slot, and the second slot is used by the network device in the second TDD system to receive, in the second slot, an uplink signal sent by the UE.

According to the method in the first aspect, the network device in the first TDD system receives, in the first radio frame, a first characteristic sequence sent by the network device in the second TDD system, where the first characteristic sequence represents device information and an interference management reference signal of the network device in the second TDD system. The network device in the first TDD system monitors, based on the device information and the interference management reference signal, an average interference value corresponding to the first characteristic sequence. When the average interference value corresponding to the first characteristic sequence is greater than a first threshold, the network device in the first TDD system communicates with the user equipment UE in the first slot in the first radio frame by using the first specified frequency domain resource. In this embodiment of this application, when the network device in the first TDD system receives the first characteristic sequence, and detects that the interference value of the first characteristic sequence is greater than the first threshold, the network device in the first TDD system automatically activates an interference coordination function.

In a possible design, the method further includes: The network device in the first TDD system monitors an interference value of a PUSCH channel; and triggers, when the interference value of the PUSCH channel is greater than a second threshold, the network device in the first TDD system to send a second characteristic sequence in the first slot in the first radio frame, where the second characteristic sequence triggers the network device in the second TDD system to communicate with the user equipment UE in the second slot in the second radio frame by using the second specified frequency domain resource. In this embodiment of this application, when detecting that the interference value of the PUSCH channel is greater than the second threshold, the network device in the first TDD system triggers an operation of sending the second characteristic sequence, so that a network device in another TDD system performs receiving monitoring, and an automatic triggering function is implemented.

According to a second aspect, this application provides an interference coordination method, applied to a communication system including a first TDD system and a second TDD system, where the first TDD system uses a first slot configuration. The method includes: A network device in the first TDD system skips, when communicating with UE in a first slot in a first radio frame, scheduling a logical channel in the first slot or a symbol in the first slot, and modifies a slot configuration of a third slot corresponding to the first slot, where a modified slot configuration of the third slot is different from the first slot configuration; and the network device in the first TDD system communicates with the UE in other slots by using the first slot configuration, where the other slots are slots in the first radio frame other than the first slot and the third slot. A time domain position of the first slot in the first radio frame is the same as a time domain position of a second slot in a second radio frame, the second slot is a slot in which a network device in the second TDD system communicates with the UE in the second radio frame, and the first slot and the second slot have different functions. In this embodiment of this application, the network device in the first TDD system skips, when communicating with the user equipment UE in the first slot in the first radio frame, scheduling the logical channel in the first slot or the symbol in the first slot, and modifies the slot configuration of the third slot corresponding to the first slot, to effectively avoid the interference between the first TDD system and the second TDD system. In addition, the network device in the first TDD system communicates with the UE in slots in the first radio frame other than the first slot by using the first slot configuration, to effectively improve spectrum bandwidth utilization. Therefore, this embodiment of this application can avoid interference and improve spectrum bandwidth utilization.

Based on the method according to the first aspect, that the second slot and the first slot have different functions is specifically as follows: The first slot is used by the network device in the first TDD system to receive, in the first slot, an uplink signal sent by the UE, and the second slot is used by the network device in the second TDD system to send a downlink signal to the UE in the second slot; or the first slot is used by the network device in the first TDD system to send a downlink signal to the UE in the first slot, and the second slot is used by the network device in the second TDD system to receive, in the second slot, an uplink signal sent by the UE.

According to the method in the first aspect, the network device in the first TDD system receives, in the first slot in the first radio frame, a first characteristic sequence sent by the network device in the second TDD system, where the first characteristic sequence represents device information and an interference management reference signal of the network device in the second TDD system. The network device in the first TDD system monitors, based on the device information and the interference management reference signal, an average interference value corresponding to the first characteristic sequence. When communicating with the UE in the first slot in the first radio frame and when the average interference value corresponding to the first characteristic sequence is greater than a first threshold, the network device in the first TDD system skips scheduling a logical channel in the first slot or a symbol in the first slot, and modifies a slot configuration of a third slot corresponding to the first slot. In this embodiment of this application, when the network device in the first TDD system receives the first characteristic sequence, and detects that the interference value of the first characteristic sequence is greater than the first threshold, the network device in the first TDD system automatically activates an interference coordination function.

In a possible design, the method further includes: The network device in the first TDD system monitors an interference value of a PUSCH channel; and triggers, when the interference value of the PUSCH channel is greater than a second threshold, the network device in the first TDD system to send a second characteristic sequence in the first radio frame, where the second characteristic sequence triggers the network device in the second TDD system to communicate with the user equipment UE in the second slot in the second radio frame by using the modified slot configuration. In this embodiment of this application, when detecting that the interference value of the PUSCH channel is greater than the second threshold, the network device in the first TDD system triggers an operation of sending the second characteristic sequence, so that a network device in another TDD system performs receiving monitoring, and an automatic triggering function is implemented.

According to a third aspect, an interference coordination method is provided, and the method is a solution combining the first aspect and the second aspect. For technical effects brought by design manners of the third aspect, refer to the technical effects brought by any possible design of the first aspect or the second aspect. Details are not described herein again.

According to a fourth aspect, an interference coordination system is provided, including a first network device and a second network device. The first network device uses a first frequency domain resource, the second network device uses a second frequency domain resource, and at least a part of frequency domain resources in the first frequency domain resource and a part of frequency domain resources in the second frequency domain resource are the same, and the system includes: The first network device is configured to: communicate with user equipment UE in a first slot in a first radio frame by using a first specified frequency domain resource, and communicate with the UE in slots in the first radio frame other than the first slot by using the first frequency domain resource, where the first specified frequency domain resource belongs to the first frequency domain resource. The second network device is configured to: communicate with the UE in a second slot in a second radio frame by using a second specified frequency domain resource, and communicate with the UE in slots in the second radio frame other than the second slot by using the second frequency domain resource, where the second specified frequency domain resource belongs to the second frequency domain resource. The first specified frequency domain resource is different from the second specified frequency domain resource, a time domain position of the first slot in the first radio frame is the same as a time domain position of the second slot in the second radio frame, and the first slot and the second slot have different functions. In this embodiment of this application, the first network device communicates with the user equipment UE in the first slot in the first radio frame by using the first specified frequency domain resource, and the second network device communicates with the user equipment UE in the second slot in the second radio frame by using the second specified frequency domain resource, to effectively avoid the interference between the first TDD system and the second TDD system. In addition, the first network device communicates with the UE in slots in the first radio frame other than the first slot by using the first frequency domain resource, and the second network device communicates with the UE in slots in the second radio frame other than the second slot by using the second frequency domain resource, to effectively improve spectrum bandwidth utilization. Therefore, this embodiment of this application can avoid interference and improve spectrum bandwidth utilization.

According to a fifth aspect, an interference coordination system is provided, including a first network device and a second network device, where the first network device uses a first slot configuration, the second network device uses a second slot configuration. The system includes the following: The first network device is configured to: skip, when communicating with UE in a first slot in a first radio frame, scheduling a logical channel in the first slot or a symbol in the first slot, and modify a slot configuration of a third slot corresponding to the first slot, where a modified slot configuration of the third slot is different from the first slot configuration. The first network device is configured to: communicate with the UE in first other slots by using the first slot configuration, where the first other slots are slots in the first radio frame other than the first slot and the third slot. The second network device is configured to: skip, when communicating with the UE in a second slot in a second radio frame, scheduling a logical channel in the second slot or a symbol in the second slot, and modify a slot configuration of a fourth slot corresponding to the second slot, where a modified slot configuration of the fourth slot is different from the second slot configuration. The second network device is configured to: communicate with the UE in second other slots by using the second slot configuration, where the second other slots are slots in the second radio frame other than the second slot and the fourth slot. A time domain position of the first slot in the first radio frame is the same as a time domain position of the second slot in the second radio frame, and the first slot and the second slot have different functions. Embodiments of this application avoid interference and improve spectrum bandwidth utilization.

According to a sixth aspect, an interference coordination apparatus is provided. The apparatus is applied to a communication system including a first TDD system and a second TDD system. The first TDD system uses a first frequency domain resource, the second TDD system uses a second frequency domain resource, and at least a part of frequency domain resources in the first frequency domain resource and a part of frequency domain resources in the second frequency domain resource are the same, and the apparatus includes a communication unit, configured to: communicate, by a network device in the first TDD system, with user equipment UE in a first slot in a first radio frame by using a first specified frequency domain resource, and communicate, by the network device in the first TDD system, with the UE in slots in the first radio frame other than the first slot by using the first frequency domain resource. The first specified frequency domain resource belongs to the first frequency domain resource, the first specified frequency domain resource is different from a second specified frequency domain resource, the second specified frequency domain resource is a frequency domain resource used by a network device in the second TDD system to communicate with the UE in a second slot in a second radio frame, the second specified frequency domain resource belongs to the second frequency domain resource, a time domain position of the second slot in the second radio frame is the same as a time domain position of the first slot in the first radio frame, and the second slot and the first slot have different functions.

Based on the apparatus according to the sixth aspect, that the second slot and the first slot have different functions is specifically as follows: The first slot is used by the network device in the first TDD system to receive, in the first slot, an uplink signal sent by the UE, and the second slot is used by the network device in the second TDD system to send a downlink signal to the UE in the second slot; or the first slot is used by the network device in the first TDD system to send a downlink signal to the UE in the first slot, and the second slot is used by the network device in the second TDD system to receive, in the second slot, an uplink signal sent by the UE.

In a possible design, the communication unit includes: a sending subunit, configured to: receive, by the network device in the first TDD system in the first radio frame, a first characteristic sequence sent by the network device in the second TDD system, where the first characteristic sequence represents device information and an interference management reference signal of the network device in the second TDD system; a monitoring subunit, configured to: monitor, by the network device in the first TDD system based on the device information and the interference management reference signal, an average interference value corresponding to the first characteristic sequence; and a communication subunit, configured to: communicate, by the network device in the first TDD system when the average interference value corresponding to the first characteristic sequence is greater than a first threshold, with the user equipment UE in the first slot in the first radio frame by using the first specified frequency domain resource.

In another possible design, the apparatus further includes: a monitoring unit, configured to: monitor, by the network device in first TDD system, an interference value of a PUSCH channel; and a triggering unit, configured to: trigger, when the interference value of the PUSCH channel is greater than a second threshold, the network device in the first TDD system to send a second characteristic sequence in the first slot in the first radio frame, where the second characteristic sequence triggers the network device in the second TDD system to communicate with the user equipment UE in the second slot in the second radio frame by using the second specified frequency domain resource.

For technical effects brought by design manners of the sixth aspect, refer to the technical effects brought by the possible designs of the first aspect. Details are not described herein again.

According to a seventh aspect, an interference coordination apparatus is provided, applied to a communication system including a first TDD system and a second TDD system, where the first TDD system uses a first slot configuration. The apparatus includes: a modification unit, configured to: skip, by a network device in the first TDD system when communicating with UE in a first slot in a first radio frame, scheduling a logical channel in the first slot or a symbol in the first slot, and modify a slot configuration of a third slot corresponding to the first slot, where a modified slot configuration of the third slot is different from the first slot configuration; and a communication unit, configured to: communicate, by the network device in the first TDD system, with the UE in other slots by using the first slot configuration, where the other slots are slots in the first radio frame other than the first slot and the third slot. A time domain position of the first slot in the first radio frame is the same as a time domain position of a second slot in a second radio frame, the second slot is a slot in which a network device in the second TDD system communicates with the UE in the second radio frame, and the first slot and the second slot have different functions.

Based on the apparatus according to the seventh aspect, that the second slot and the first slot have different functions is specifically as follows: The first slot is used by the network device in the first TDD system to receive, in the first slot, an uplink signal sent by the UE, and the second slot is used by the network device in the second TDD system to send a downlink signal to the UE in the second slot; or the first slot is used by the network device in the first TDD system to send a downlink signal to the UE in the first slot, and the second slot is used by the network device in the second TDD system to receive, in the second slot, an uplink signal sent by the UE.

Based on the apparatus according to the seventh aspect, the modification unit includes: a receiving subunit, configured to: receive, by the network device in the first TDD system in the first slot in the first radio frame, a first characteristic sequence sent by the network device in the second TDD system, where the first characteristic sequence represents device information and an interference management reference signal of the network device in the second TDD system; a monitoring subunit, configured to: monitor, by the network device in the first TDD system based on the device information and the interference management reference signal, an average interference value corresponding to the first characteristic sequence; and a modifying subunit, configured to: skip, by the network device in the first TDD system when communicating with the UE in the first slot in the first radio frame and when the average interference value corresponding to the first characteristic sequence is greater than a first threshold, scheduling a logical channel in the first slot or a symbol in the first slot, and modify a slot configuration of a third slot corresponding to the first slot.

In a possible design, the apparatus further includes: a monitoring unit, configured to: monitor, by the network device in the first TDD system, an interference value of a PUSCH channel; and a triggering unit, configured to: trigger, when the interference value of the PUSCH channel is greater than a second threshold, the network device in the first TDD system to send a second characteristic sequence in the first radio frame, where the second characteristic sequence triggers the network device in the second TDD system to communicate with the user equipment UE in the second slot in the second radio frame by using the modified slot configuration.

For technical effects brought by design manners of the seventh aspect, refer to the technical effects brought by the possible designs of the second aspect. Details are not described herein again.

According to an eighth aspect, a network device is provided, including a processor and a memory. The memory is coupled to the processor, the memory is configured to store computer program code, and the computer program code includes computer instructions. When the processor reads the computer instructions from the memory, the network device is enabled to perform the interference coordination method in the first aspect or any possible design of the first aspect.

According to a ninth aspect, a computer program product is provided. When the computer program product runs on a computer, the computer is enabled to perform the interference coordination method in the first aspect or any possible design of the first aspect.

According to a tenth aspect, a computer-readable storage medium is provided, including computer instructions. When the computer instructions are run on a terminal, the network device is enabled to perform the interference coordination method in the first aspect or any possible design of the first aspect.

According to an eleventh aspect, a chip system is provided, including one or more processors. When the one or more processors execute instructions, the one or more processors perform the interference coordination method in the first aspect or any possible design of the first aspect.

For technical effects brought by any design manner of the eighth aspect to the eleventh aspect, refer to the technical effects brought by the possible designs of the first aspect. Details are not described herein again.

According to a twelfth aspect, a network device is provided, including a processor and a memory. The memory is coupled to the processor, the memory is configured to store computer program code, and the computer program code includes computer instructions. When the processor reads the computer instructions from the memory, the network device is enabled to perform the interference coordination method in the second aspect or any possible design of the second aspect.

According to a thirteenth aspect, a computer program product is provided. When the computer program product runs on a computer, the computer is enabled to perform the interference coordination method in the second aspect or any possible design of the second aspect.

According to a fourteenth aspect, a computer-readable storage medium is provided, including computer instructions. When the computer instructions are run on a terminal, the network device is enabled to perform the interference coordination method in the second aspect or any possible design of the second aspect.

According to a fifteenth aspect, a chip system is provided, including one or more processors. When the one or more processors execute instructions, the one or more processors perform the interference coordination method in the second aspect or any possible design of the second aspect.

For technical effects brought by any design manner of the twelfth aspect to the fifteenth aspect, refer to the technical effects brought by the possible designs of the second aspect. Details are not described herein again.

BRIEF DESCRIPTION OF THE DRAWINGS

To explain technical solutions in embodiments of this application more clearly, the following briefly describes accompanying drawings used for describing the embodiments or a current technology. It is clear that the accompanying drawings in the following descriptions show merely some embodiments of this application, and a person of ordinary skill in the art may still derive other drawings from these accompanying drawings without creative efforts.

FIG. 5 is a flowchart of a communication method according to an embodiment of this application;

FIG. 5a is a flowchart of still another interference coordination method according to an embodiment of this application;

DETAILED DESCRIPTION OF ILLUSTRATIVE EMBODIMENTS

In a communication system, in a scenario in which neighboring countries or regions use a same frequency band or frequency bands close to each other, if a first TDD system and a second TDD system are neighboring systems, and a slot assignment of the first TDD system is different from a slot assignment of the second TDD system, the first TDD system and the second TDD system are referred to as neighboring asynchronous TDD systems of each other. Because the slot assignment of the first TDD system is different from the slot assignment of the second TDD system, the first TDD system transmits uplink service data in some slots (for example, a first slot), and the second TDD system transmits downlink service data in these slots. Consequently, interference is generated when the first TDD system transmits the uplink service data and the second TDD system transmits the downlink service data in the first slot.

To avoid the interference caused by uplink and downlink scheduling between the first TDD system and the second TDD system due to different slot assignments, each TDD system uses a different frequency domain resource at a geographical boundary of the first TDD system and the second TDD system to avoid interference.

Figure 1:
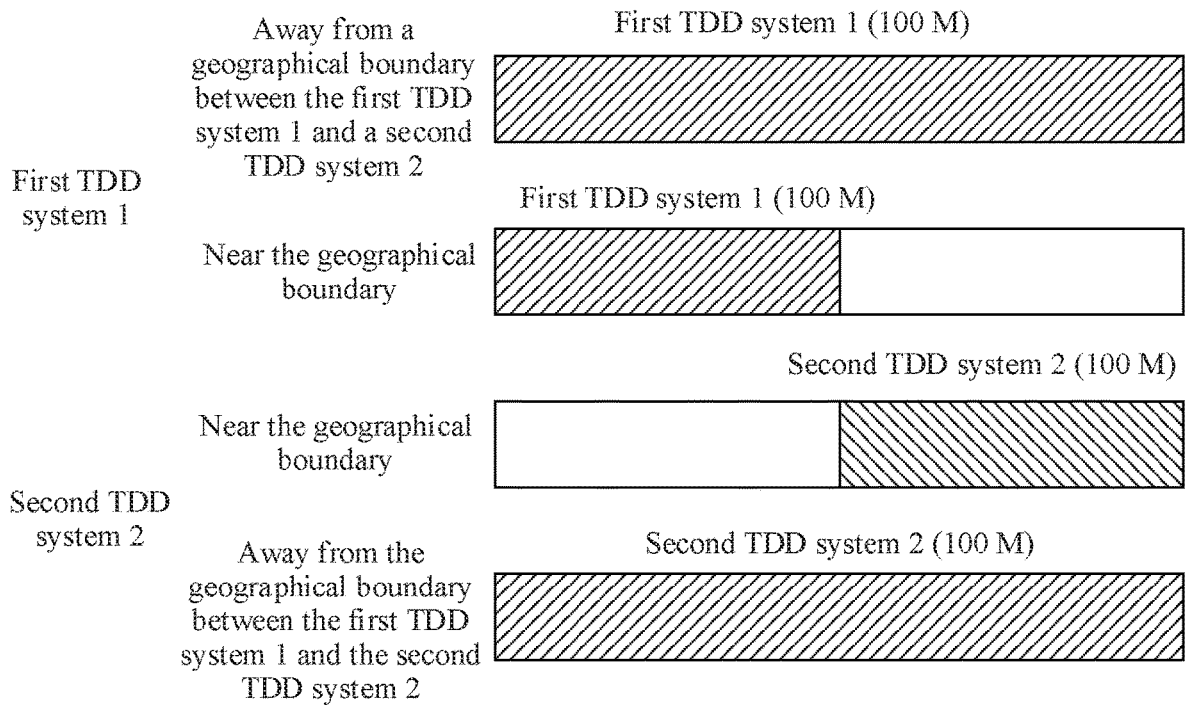
FIG. 1 is a schematic diagram of inter-frequency coordination in an existing TDD system.

For example, as shown in FIG. 1, at a geographical boundary of the first TDD system and the second TDD system, a first network device in the first TDD system sends a downlink signal to user equipment (User Experience, UX or UE for short) by using a first part of spectrum bandwidth in a first spectrum bandwidth, and a second network device in the second TDD system receives, by using a second part of spectrum bandwidth in a second spectrum bandwidth, an uplink signal transmitted by the UE. At a position away from the geographical boundary of the first TDD system and the second TDD system, a first network device in the first TDD system sends a downlink signal to UE by using the first spectrum bandwidth, and a second network device in the second TDD system receives, by using the second spectrum bandwidth, an uplink signal transmitted by the UE.

At least a part of the first spectrum bandwidth and a part of the second spectrum bandwidth are the same, and the first part of the spectrum bandwidth and the second part of the spectrum bandwidth are different.

It is assumed that the first spectrum bandwidth and the second spectrum bandwidth are the same, and both are 100 M. The first part of the spectrum bandwidth is 50 M, the second part of the spectrum bandwidth is 100 M-50 M, and the first part of the spectrum bandwidth and the second part of the spectrum bandwidth are different. As shown in Table 1, at the geographical boundary of the first TDD system and the second TDD system, the first network device in the first TDD system sends the downlink signal to the UE by using a spectrum bandwidth of 50 M, and the second network device in the second TDD system receives, by using another spectrum bandwidth of 50 M, the uplink signal transmitted by the UE. In Table 1, a slot assignment of the first TDD system may be DDDSU (10:2:2), where 10:2:2 indicates a quantity of uplink symbols:a guard period (GP) during switching between uplink and downlink data transmission:a quantity of downlink symbols in the S slot. A slot assignment of the second TDD system may be DDDSUUDDDD (6:4:4), where 6:4:4 indicates a quantity of uplink symbols: GP:a quantity of downlink symbols in the S slot.

TABLE 1

| | Slot assignment slot | 0 | 1 | 2 | 3 | 4 | 5 | 6 | 7 | 8 | 9 |
|---|---|---|---|---|---|---|---|---|---|---|---|
| First TDD system 1 | Spectrum resource DDDSU (10:2:2) | D | D | D | S | 50M U | D | D | D | S | U |
| Second TDD system 2 | DDDSUUDDDD (6:4:4) Spectrum resource | D | D | D | S | U | U 50M | D | D | D | D |

However, because each TDD system can use only a part of spectrum resources, an available spectrum bandwidth is reduced, and utilization of a spectrum bandwidth of each TDD system is low.

To resolve the technical problem, an embodiment of this application provides an interference coordination method. The method is applied to a communication system including a first TDD system and a second TDD system. The first TDD system uses a first frequency domain resource, the second TDD system uses a second frequency domain resource, and at least a part of frequency domain resources in the first frequency domain resource and a part of frequency domain resources in the second frequency domain resource are the same. The method includes: A network device in the first TDD system communicates with user equipment UE in a first slot in a first radio frame by using a first specified frequency domain resource, and the network device in the first TDD system communicates with the UE in slots in the first radio frame other than the first slot by using the first frequency domain resource. The first specified frequency domain resource belongs to the first frequency domain resource, the first specified frequency domain resource is different from a second specified frequency domain resource, the second specified frequency domain resource is a frequency domain resource used by a network device in the second TDD system to communicate with the UE in a second slot in a second radio frame, the second specified frequency domain resource belongs to the second frequency domain resource, a time domain position of the second slot in the second radio frame is the same as a time domain position of the first slot in the first radio frame, and the second slot and the first slot have different functions. In this way, interference is avoided and spectrum bandwidth utilization is improved.

The following describes the interference coordination method provided in this embodiment of this application with reference to the accompanying drawings in embodiments of this application.

Figure 2:
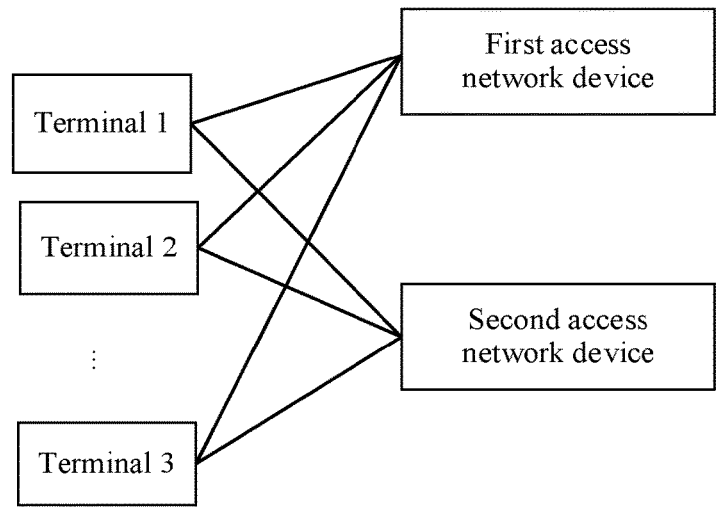
FIG. 2 is a schematic diagram of an architecture of a communication system.

The interference coordination method provided in this embodiment of this application may be applied to a communication system shown in FIG. 2. As shown in FIG. 2, the communication system may include terminal UE, a first access network device, and a second access network device. The access network device may include a network device. The network device may be a base station. The following describes network elements or devices in the architecture shown in FIG. 1.

The terminal may be a device configured to implement a wireless communication function, for example, a terminal or a chip that can be used in the terminal. The terminal may be user equipment (UE), an access terminal, a terminal unit, a terminal station, a mobile station, a remote station, a remote terminal, a mobile device, a wireless communication device, a terminal agent, a terminal apparatus, or the like in a 5G network or a future evolved communication system. The access terminal may be a cellular phone, a cordless phone, a session initiation protocol (SIP) phone, a wireless local loop (WLL) station, a personal digital assistant (PDA), a handheld device or a computing device having a wireless communication function, another processing device, vehicle-mounted device, or wearable device connected to a wireless modem, a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or the like. The terminal may be mobile or fixed.

The access network device is mainly configured to implement functions such as a physical layer function, resource scheduling and management, and access control and mobility management of the terminal. The access network device may be a device supporting wired access, or may be a device supporting wireless access. For example, the access network device may be an access network (AN)/a radio access network (RAN), where the AN/RAN includes a plurality of 5G-AN/5G-RAN nodes. The 5G-AN/5G-RAN node may be an access point (AP), a network side device (NB), an enhanced network side device (eNB), a next-generation network side device (NR NodeB, gNB), a transmission reception point (TRP), a transmission point (TP), another access node, or the like.

It should be noted that FIG. 2 is merely an example diagram of the architecture. In addition to the functional units shown in FIG. 2, the system may further include another functional network element, for example, an operation and management (O&M) network element. This is not limited in this embodiment of this application. In addition, names of the devices in FIG. 2 are not limited. In addition to the names shown in FIG. 2, the devices may also have other names. For example, the names may be replaced with names of network elements having same or similar functions. This is not limited.

The system shown in FIG. 2 may be a 3rd Generation Partnership Project (3GPP) communication system, for example, a 4th generation (4G) communication system, a long term evolution (LTE) system, a 5th generation (5G) communication system, a new radio (NR) system, a next generation communication system, or a non-3GPP communication system. This is not limited.

In an example in which the communication system shown in FIG. 2 is a 3G communication system, the network device may be a network side device (NodeB, NB) in the 3G communication system. In an example in which the communication system shown in FIG. 2 is a 4G communication system, the network device may be an enhanced network side device (enhanced NodeB, eNB) in the 4G communication system. In an example in which the communication system shown in FIG. 2 is a 5G communication system, the network device may be a next generation network side device (NR NodeB, gNB) in the 5G communication system.

Optionally, a related function of the network device in this embodiment of this application may be implemented by one device, or may be jointly implemented by a plurality of devices, or may be implemented by one or more functional modules in one device. This is not specifically limited in this embodiment of this application. It may be understood that the foregoing function may be a network element in a hardware device, may be a software function running on dedicated hardware, a combination of hardware and software, or a virtualization function instantiated on a platform (for example, a cloud platform).

Figures 3, 4:
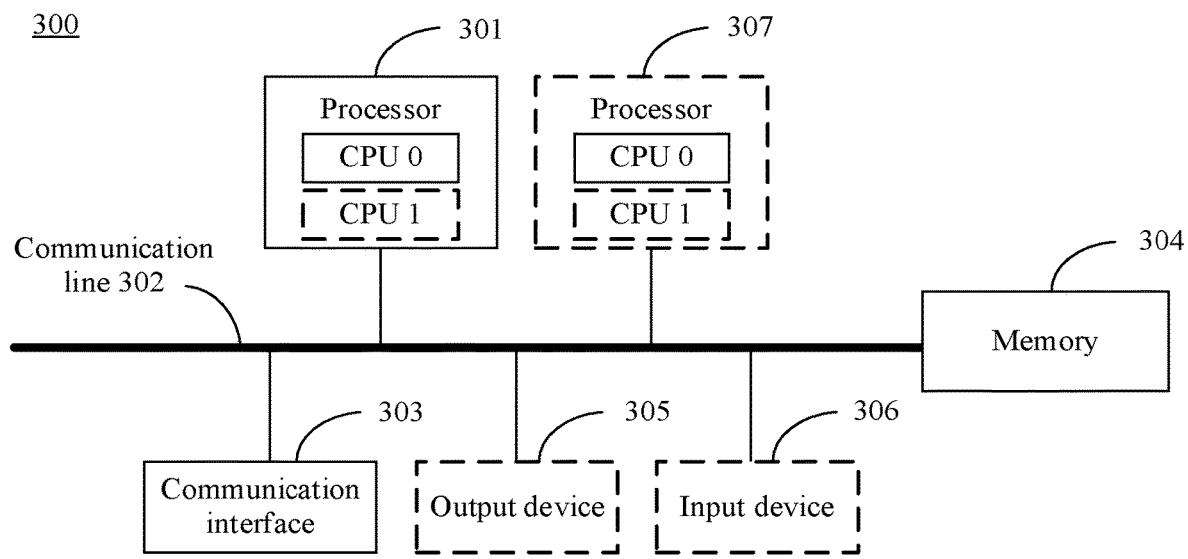
FIG. 3 is a schematic composition diagram of a communication system 300 according to an embodiment of this application.
FIG. 4 is a flowchart of an interference coordination method according to an embodiment of this application.

During specific implementation, each device (for example, the network device) shown in FIG. 2 may use a composition structure shown in FIG. 3, or include components shown in FIG. 3. FIG. 3 is a schematic composition diagram of a communication apparatus 300 according to an embodiment of this application. The communication apparatus 300 may include a processor 301 and a memory 304. Further, the communication apparatus 300 may include a communication line 302 and a communication interface 303. The processor 301, the memory 304, and the communication interface 303 may be connected to each other through the communication line 302.

The processor 301 may be a central processing unit (CPU), a general-purpose processor, a network processor (NP), a digital signal processor (DSP), a microprocessor, a microcontroller, a programmable logic device (PLD), or any combination thereof. Alternatively, the processor 301 may be another apparatus having a processing function, for example, a circuit, a component, or a software module. This is not limited.

The communication line 302 is configured to transmit information between the components included in the communication apparatus 300.

The communication interface 303 is configured to communicate with another device or another communication network. The another communication network may be an Ethernet, a radio access network (RAN), a wireless local area network (WLAN), or the like. The communication interface 303 may be a module, a circuit, a transceiver, or any apparatus that can implement communication.

The memory 304 is configured to store instructions. The instructions may be a computer program.

The memory 304 may be a read-only memory (ROM) or another type of static storage device that can store static information and/or instructions, a random access memory (RAM) or another type of dynamic storage device that can store information and/or instructions, an electrically erasable programmable read-only memory (EEPROM), a compact disc read-only memory (CD-ROM) or another compact disc storage, an optical disc storage (including a compressed optical disc, a laser disc, an optical disc, a digital versatile disc, or a Blu-ray disc), a magnetic disk storage medium, or another magnetic storage device. This is not limited.

It should be noted that the memory 304 may exist independently of the processor 301, or may be integrated with the processor 301. The memory 304 may be configured to store instructions, program code, some data, or the like. The memory 304 may be located inside the communication apparatus 300, or may be located outside the communication apparatus 300. This is not limited.

The processor 301 is configured to execute the instructions stored in the memory 304, to implement a service switching method provided in the following embodiments of this application. For example, when the communication apparatus 300 is a chip or a system-on-a-chip in a network device, the processor 301 executes the instructions stored in the memory 304, to implement steps performed by the network device in the following embodiments of this application.

In an example, the processor 301 may include one or more CPUs, for example, a CPU 0 and a CPU 1 in FIG. 3.

In an optional implementation, the communication apparatus 300 includes a plurality of processors. For example, in addition to the processor 301 in FIG. 3, the communication apparatus 300 may further include a processor 307.

In an optional implementation, the communication apparatus 300 further includes an output device 305 and an input device 306. For example, the input device 306 is a device such as a keyboard, a mouse, a microphone, or a joystick, and the output device 305 is a device such as a display or a speaker.

It should be noted that the communication apparatus 300 may be a desktop computer, a portable computer, a network server, a mobile phone, a tablet computer, a wireless terminal, an embedded device, a chip system, or a device having a structure similar to that in FIG. 3. In addition, the composition structure shown in FIG. 3 does not constitute a limitation on the communication apparatus. In addition to the components shown in FIG. 3, the communication apparatus may include more or fewer components than those shown in the figure, or some components may be combined, or different component arrangements may be used.

In embodiments of this application, the chip system may include a chip, or may include a chip and another discrete component.

In addition, actions, terms, and the like in embodiments of this application may be mutually referenced. This is not limited. In embodiments of this application, names of messages exchanged between devices, names of parameters in the messages, or the like are merely examples. Other names may alternatively be used during specific implementation. This is not limited.

The following uses the architecture shown in FIG. 2 as an example to describe the interference coordination method provided in embodiments of this application. Network elements in the following embodiments may have the components shown in FIG. 3. Details are not described again. It should be noted that, in embodiments of this application, names of messages exchanged between devices, names of parameters in the messages, or the like are merely examples. Other names may alternatively be used during specific implementation. "Determining" in embodiments of this application may also be understood as creating (create) or generating (generate), and "including" in embodiments of this application may also be understood as "carrying". Descriptions are uniformly provided herein. Details are not specifically limited in embodiments of this application.

FIG. 4 shows an interference coordination method provided in an embodiment of this application. The method is applied to a communication system including a first TDD system and a second TDD system. The first TDD system uses a first frequency domain resource, the second TDD system uses a second frequency domain resource, and at least a part of frequency domain resources in the first frequency domain resource and a part of frequency domain resources in the second frequency domain resource are the same. As shown in FIG. 4, the method may include the following steps.

Step 401: A network device in the first TDD system communicates with user equipment UE in a first slot in a first radio frame by using a first specified frequency domain resource, and the network device in the first TDD system communicates with the UE in slots in the first radio frame other than the first slot by using the first frequency domain resource.

The first TDD system may include a plurality of network devices. The network device may be a network side device (NodeB, NB), an enhanced network side device (enhanced NodeB, eNB), or a next generation network side device (NR NodeB, gNB) in the access network device in FIG. 1. The user equipment UE (User Experience) may be a terminal in FIG. 2. For example, the user equipment UE may be a terminal 1, a terminal 2, or a terminal 3 in FIG. 2. That the network device in the first TDD system communicates with the user equipment UE may include: The network device sends an information scheduling instruction to the user equipment UE, or the network device performs service data transmission with the user equipment UE.

Similarly, the second TDD system may also include a plurality of network devices. The network device may be a network side device (NodeB, NB), an enhanced network side device (enhanced NodeB, eNB), or a next generation network side device (NR NodeB, gNB) in the access network device in FIG. 1. The user equipment UE (User Experience) may be a terminal in FIG. 2. For example, the user equipment UE may be a terminal 1, a terminal 2, or a terminal 3 in FIG. 2. That a network device in the second TDD system communicates with the user equipment UE may include: The network device in the first TDD system sends an information scheduling instruction to the user equipment UE, or the network device in the second TDD system performs service data transmission with the user equipment UE.

A communication system in a TDD mode uses a radio frame structure. A radio frame may have a length of 10 ms, and includes two half-frames with a length of 5 ms. Each half-frame includes five subframes with a length of 1 ms. It may also be understood as that the entire radio frame is divided into 10 subframes with a length of 1 ms, and the subframe is used as a unit for data scheduling and transmission. The subframe may be a common subframe or a special subframe, and the common subframe may include one common slot, for example, a downlink slot DwPTS or an uplink slot UpPTS. The special subframe may include a special slot, and the special slot includes a DwPTS, a guard period GP, and an UpPTS. A length of the DwPTS may be configured as 3 to 12 OFDM symbols, and the DwPTS is used for normal transmission of a downlink control channel and a downlink shared channel. A length of the UpPTS may be configured as 1 or 2 OFDM symbols, and the UpPTS may be used to carry an uplink physical random access channel and a sounding pilot signal. A length of the GP may be configured as 1 to 14 OFDM symbols, and the GP is used as the guard period between uplink and downlink. A corresponding time length is 71 μs to 714 μs, and a corresponding cell radius is 7 km to 100 km.

It can be learned that, a slot position of the first slot is found in the first radio frame of the network device in the first TDD system, and a function of the first slot may be learned with reference to a slot assignment of the network device in the first TDD system. Similarly, a slot position of the second slot is found in the second radio frame of the network device in the second TDD system, and a function of the second slot may be learned with reference to a slot assignment of the network device in the second TDD system.

That the second slot and the first slot have different functions is specifically as follows.

The first slot is used by the network device in the first TDD system to receive, in the first slot, an uplink signal sent by the UE, and the second slot is used by the network device in the second TDD system to send a downlink signal to the UE in the second slot; or the first slot is used by the network device in the first TDD system to send a downlink signal to the UE in the first slot, and the second slot is used by the network device in the second TDD system to receive, in the second slot, an uplink signal sent by the UE.

Example 1: It is assumed that the slot assignment of the network device in the first TDD system 1 may be DDDSU (10:2:2), and the slot assignment of the network device in the second TDD system 2 may be DDDSUUDDDD (6:4:4). It is clear that the slot assignment of the network device in the first TDD system 1 and the slot assignment of the network device in the second TDD system 2 are not limited to the foregoing, and may be other assignments. This is not specifically limited in this embodiment of this application. If the slot assignment of the network device in the first TDD system 1 is DDDSU (10:2:2), where 10:2:2 indicates a quantity of uplink symbols:a guard period (GP) during switching between uplink and downlink data transmission:a quantity of downlink symbols in the S slot; and the slot assignment of the network device in the second TDD system 2 is DDDSUUDDDD (6:4:4), where 10:2:2 indicates a quantity of uplink symbols: a guard period during switching between uplink and downlink data transmission:a quantity of downlink symbols in the S slot, slot arrangements of the network device in the first TDD system 1 and the network device in the second TDD system 2 may be obtained, as shown in Table 2:

TABLE 2

| TDD system | Slot assignment | 0 | 1 | 2 | 3 | 4 | 5 | 6 | 7 | 8 | 9 |
|---|---|---|---|---|---|---|---|---|---|---|---|
| First TDD system 1 | DDDSU | D | D | D | S | U | D | D | D | S | U |
| Second TDD system 2 | DDDSUUDDDD | D | D | D | S | U | U | D | D | D | D |

Numbers 0 to 9 in Table 2 represent 10 subframes of a radio frame. A first subframe (0) of the first TDD system 1 includes a downlink slot (D), and a first subframe (0) of the second TDD system 2 includes a downlink slot (D); a second subframe (1) of the first TDD system 1 includes a downlink slot (D), and a second subframe (1) of the second TDD system 2 includes a downlink slot (D); a third subframe (2) of the first TDD system 1 includes a downlink slot (D), and a third subframe (2) of the second TDD system 2 includes a downlink slot (D); a fourth subframe (3) of the first TDD system 1 includes a special slot (S), and a fourth subframe (3) of the second TDD system 2 includes a special slot (S), where the special slot (S) may include a DwPTS, a guard period GP, and an UpPTS; a fifth subframe (4) of the first TDD system 1 includes an uplink slot (U), and a fifth subframe (4) of the second TDD system 2 includes an uplink slot (U); a sixth subframe (5) of the first TDD system 1 includes a downlink slot (D), and a sixth subframe (5) of the second TDD system 2 includes an uplink slot (U); a seventh subframe (6) of the first TDD system 1 includes a downlink slot (D), and a seventh subframe (6) of the second TDD system 2 includes a downlink slot (D); an eighth subframe (7) of the first TDD system 1 includes a downlink slot (D), and an eighth subframe (7) of the second TDD system 2 includes a downlink slot (D); a ninth subframe (8) of the first TDD system 1 includes a special slot (S), and a ninth subframe (8) of the second TDD system 2 includes a downlink slot (D), where the special slot (S) may include a DwPTS, a guard period GP, and an UpPTS; and a tenth subframe (9) of the first TDD system 1 includes an uplink slot (U), and a tenth subframe (9) of the second TDD system 2 includes a downlink slot (D). The uplink slot is used to transmit an uplink signal, and the downlink slot is used to transmit a downlink signal.

Assuming that the first slot in the first radio frame of the network device in the first TDD system 1 is in the fourth subframe, the first slot is a special slot, and may be an uplink slot, a guard period, or a downlink slot; and assuming that the second slot in the second radio frame of the network device in the second TDD system 2 is in the fourth subframe, the second slot is a special slot, and may be an uplink slot, a guard period, or a downlink slot. When the first slot in the first radio frame of the network device in the first TDD system 1 is an uplink slot, and the second slot in the second radio frame of the network device in the second TDD system 2 is a downlink slot, it is determined that the network device in the first TDD system 1 receives, in the first slot in the first radio frame, the uplink signal sent by the UE, the network device in the second TDD system 2 sends the downlink signal to the UE in the second slot in the second radio frame, and interference exists between the two TDD systems.

Similarly, when the first slot in the first radio frame of the network device in the first TDD system 1 is in the sixth subframe, the first slot is a downlink slot; and when the second slot in the second radio frame of the network device in the second TDD system 2 is in the sixth subframe, the second slot is an uplink slot. When the network device in the first TDD system 1 sends the downlink signal to the UE in the first slot in the first radio frame, and the network device in the second TDD system 2 receives, in the second slot in the second radio frame, the uplink signal sent by the UE, interference exists between the two TDD systems.

Similarly, when the first slot in the first radio frame of the network device in the first TDD system 1 is in the ninth subframe, the first slot is a special slot, and may be an uplink slot, a guard period, or a downlink slot; and when the second slot in the second radio frame of the network device in the second TDD system 2 is in the ninth subframe, the second slot is a downlink slot. When the first slot in the first radio frame of the network device in the first TDD system 1 is an uplink slot, and the second slot in the second radio frame of the network device in the second TDD system 2 is a downlink slot, it is determined that the network device in the first TDD system 1 receives, in the first slot in the first radio frame, the uplink signal sent by the UE, the network device in the second TDD system 2 sends the downlink signal to the UE in the second slot in the second radio frame, and interference exists between the two TDD systems.

Similarly, when the first slot in the first radio frame of the network device in the first TDD system 1 is in the tenth subframe, the first slot is an uplink slot; and when the second slot in the second radio frame of the network device in the second TDD system 2 is in the tenth subframe, the second slot is a downlink slot. When the network device in the first TDD system 1 receives, in the first slot in the first radio frame, the uplink signal sent by the UE, and the network device in the second TDD system 2 sends the downlink signal to the UE in the second slot in the second radio frame, interference exists between the two TDD systems.

In conclusion, to avoid interference, in this application, the network device in the first TDD system communicates with the user equipment UE in the first slot in the first radio frame by using the first specified frequency domain resource. The first specified frequency domain resource belongs to the first frequency domain resource, the first specified frequency domain resource is different from a second specified frequency domain resource, the second specified frequency domain resource is a frequency domain resource used by the network device in the second TDD system to communicate with the UE in the second slot in the second radio frame, and the second specified frequency domain resource belongs to the second frequency domain resource.

In other words, when the time domain position of the first slot in the first radio frame is the same as the time domain position of the second slot in the second radio frame, and the first slot and the second slot have different functions, the network device in the first TDD system communicates with the user equipment UE in the first slot in the first radio frame by using the first specified frequency domain resource, where the first specified frequency domain resource is different from the second specified frequency domain resource used by the network device in the second TDD system to communicate with the user equipment UE in the second slot in the second radio frame.

It may also be understood as that, when the time domain position of the first slot in the first radio frame is the same as the time domain position of the second slot in the second radio frame, and the first slot and the second slot have different functions, the network device in the first TDD system communicates with the user equipment UE in the first slot in the first radio frame by using the first specified frequency domain resource, and the network device in the second TDD system communicates with the user equipment UE in the second slot in the second radio frame by using the second specified frequency domain resource, where the first specified frequency domain resource is different from the second specified frequency domain resource.

To ensure frequency domain resource utilization of the network device in the first TDD system, when the time domain position of the first slot in the first radio frame is the same as the time domain position of the second slot in the second radio frame, and the first slot and the second slot have different functions, the network device in the first TDD system communicates with the user equipment UE in the first slot in the first radio frame by using the first specified frequency domain resource. In addition, the network device in the first TDD system communicates with the UE in slots in the first radio frame other than the first slot by using the first frequency domain resource, where the first specified frequency domain resource belongs to the first frequency domain resource.

Example 2: It is assumed that spectrum ranges of the network device in the first TDD system and the network device in the second TDD system are both 3500 M to 3600 M. In this case, both the first frequency domain resource and the second frequency domain resource are frequency domain bandwidths of 100 M. The first specified frequency domain resource is a frequency domain bandwidth of 50 M (for example, 3500 M to 3550 M), and the second specified frequency domain resource is a frequency domain bandwidth of the other 50 M (for example, 3551 M to 3560 M), namely, 50 M other than the 50 M used by the network device in the first TDD system 1.

The foregoing example 1 is still used. The first slot in the first radio frame of the network device in the first TDD system 1 is located in the fourth subframe (3). The second slot in the second radio frame of the network device in the second TDD system 2 is located in the fourth subframe (3). The first slot may be used by the network device in the first TDD system 1 to send the downlink signal to the UE, and the second slot may be used by the network device in the second TDD system 2 to receive the uplink signal sent by the UE. Alternatively, the first slot may be used by the network device in the first TDD system 1 to receive the uplink signal sent by the UE, and the second slot may be used by the network device in the second TDD system 2 to send the downlink signal to the UE. In this case, as shown in Table 3, the network device in the first TDD system 1 communicates with the UE in the first slot in the first radio frame by using the first specified frequency domain resource (namely, a frequency domain bandwidth of 50 M), and the network device in the second TDD system 2 communicates with the UE in the second slot in the second radio frame by using the second specified frequency domain resource (namely, a frequency domain bandwidth of 50 M other than the frequency domain bandwidth of 50 M used by the network device in the first TDD system 1).

Similarly, the first slot in the first radio frame of the network device in the first TDD system 1 is located in the sixth subframe (5). The second slot in the second radio frame of the network device in the second TDD system 2 is located in the sixth subframe (5). The first slot is used by the network device in the first TDD system 1 to send the downlink signal to the UE in the first slot, and the second slot may be used by the network device in the second TDD system 2 to receive the uplink signal sent by the UE. In this case, as shown in Table 3, the network device in the first TDD system 1 to receive the uplink signal sent by the UE, and the second slot may be used by the network device in the second TDD system 2 to send the downlink signal to the UE. In this case, as shown in Table 3, the network device in the first TDD system 1 communicates with the UE in the first slot in the first radio frame by using the first specified frequency domain resource (namely, a frequency domain bandwidth of 50 M), and the network device in the second TDD system 2 communicates with the UE in the second slot in the second radio frame by using the second specified frequency domain resource (namely, a frequency domain bandwidth of 50 M other than the frequency domain bandwidth of 50 M used by the network device in the first TDD system 1).

In addition, the network device in the first TDD system communicates with the UE in slots in the first radio frame other than the first slot by using the first frequency domain resource (namely, 100 M).

TABLE 3

| | Slot assignment | 0 | 1 | 2 | 3 | 4 | 5 | 6 | 7 | 8 | 9 |
|---|---|---|---|---|---|---|---|---|---|---|---|
| First TDD system 1 | Spectrum resource | 100M | | | 50M | 100M | 50M | 100M | | 50M | 50M |
| | DDDSU (10:2:2) | D | D | D | S | U | D | D | D | S | U |
| First TDD system 2 | DDDSUUDDDD (6:4:4) | D | D | D | S | U | U | D | D | D | D |
| | Spectrum resource | 100M | | | 50M | 100M | 50M | 100M | | 50M | 50M |

TDD system 1 communicates with the UE in the first slot in the first radio frame by using the first specified frequency domain resource (namely, a frequency domain bandwidth of 50 M), and the network device in the second TDD system 2 communicates with the UE in the second slot in the second radio frame by using the second specified frequency domain resource (namely, a frequency domain bandwidth of 50 M other than the frequency domain bandwidth of 50 M used by the network device in the first TDD system 1).

Similarly, the first slot in the first radio frame of the network device in the first TDD system 1 is located in the ninth subframe (8). The second slot in the second radio frame of the network device in the second TDD system 2 is located in the ninth subframe (8). The first slot may alternatively be used by the network device in the first TDD system 1 to receive the uplink signal sent by the UE, and the second slot may be used by the network device in the second TDD system 2 to send the downlink signal to the UE. In this case, as shown in Table 3, the network device in the first TDD system 1 communicates with the UE in the first slot in the first radio frame by using the first specified frequency domain resource (namely, a frequency domain bandwidth of 50 M), and the network device in the second TDD system 2 communicates with the UE in the second slot in the second radio frame by using the second specified frequency domain resource (namely, a frequency domain bandwidth of 50 M other than the frequency domain bandwidth of 50 M used by the network device in the first TDD system 1).

Similarly, the first slot in the first radio frame of the network device in the first TDD system 1 is located in the tenth subframe (9). The second slot in the second radio frame of the network device in the second TDD system 2 is located in the tenth subframe (9). The first slot may alternatively be used by the network device in the first TDD system 1 to receive the uplink signal sent by the UE, and the second slot may be used by the network device in the second TDD system 2 to send the downlink signal to the UE. In this case, as shown in Table 3, the network device in the first TDD system 1 communicates with the UE in the first slot in the first radio frame by using the first specified frequency domain resource (namely, a frequency domain bandwidth of 50 M), and the network device in the second TDD system 2 communicates with the UE in the second slot in the second radio frame by using the second specified frequency domain resource (namely, a frequency domain bandwidth of 50 M other than the frequency domain bandwidth of 50 M used by the network device in the first TDD system 1).

Through verification, it is obtained that spectrum utilization of the network device in the first TDD system 1 may be $(6*14*100+4*14*50)/10*14*50=160\%$, and spectrum utilization of the network device in the second TDD system 2 may be $(6*14*100+4*14*50)/10*14*50=160\%$. It can be learned that the spectrum utilization of the first TDD system 1 and the spectrum utilization of the second TDD system 2 are both improved.

Certainly, spectrum ranges of the network device in the first TDD system and the network device in the second TDD system may alternatively be different. For example, the spectrum range of the network device in the first TDD system is 3500 M to 3580 M, and the spectrum range of the network device in the second TDD system is 3520 M to 3560 M. Operators of the two TDD systems may negotiate to allocate the spectrum. For example, the first specified frequency domain resource may be a frequency domain bandwidth of 50 M (for example, 3500 M to 3530 M and 3561 M to 3580 M), and the second specified frequency domain resource is a frequency domain bandwidth of the other 30 M (for example, 3531 M to 3560 M). Certainly, the spectrum may alternatively be allocated in another form. This is not limited in this embodiment of this application.

Figure 4A:
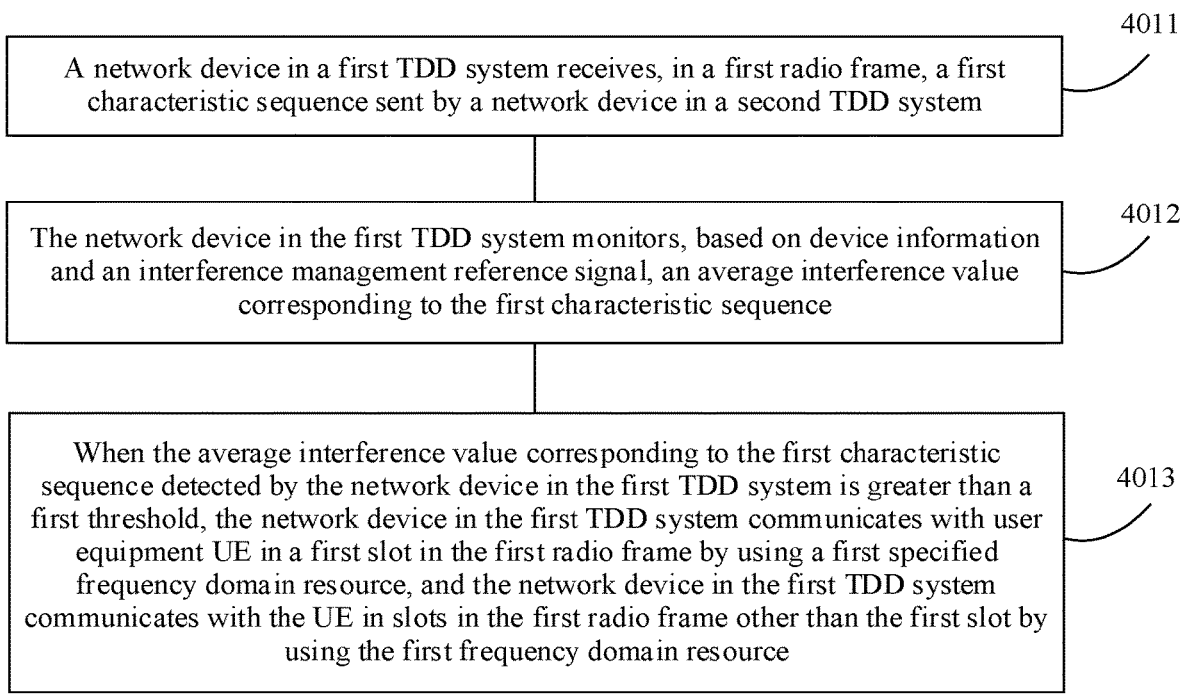
FIG. 4a is a flowchart of another interference coordination method according to an embodiment of this application.

In an embodiment, as shown in FIG. 4a, step 401 may be specifically implemented as follows.

Step 4011: The network device in the first TDD system receives, in the first radio frame, a first characteristic sequence sent by the network device in the second TDD system.

The network device in the first TDD system may receive, in a subframe in the first radio frame, the first characteristic sequence sent by the network device in the second TDD system. A specific subframe in the first radio frame in which the network device in the first TDD system receives the first characteristic sequence sent by the network device in the second TDD system is not specifically limited in this application, provided that the network device in the first TDD system receives, in the first radio frame, the first characteristic sequence sent by the network device in the second TDD system.

For example, as shown in FIG. 4, the network device in the first TDD system receives, in the tenth subframe in the first radio frame, the first characteristic sequence sent by the network device in the second TDD system.

Step 402: The network device in the first TDD system monitors an interference value of a PUSCH channel.

Step 403: When the interference value of the PUSCH channel is greater than a second threshold, trigger the network device in the first TDD system to send a second characteristic sequence in the first radio frame.

The second threshold may be set as required. This is not limited. For example, the second threshold may be −107 dB.

The second characteristic sequence triggers the network device in the second TDD system to communicate with the

TABLE 4

| | Slot assignment | 0 | 1 | 2 | 3 | 4 | 5 | 6 | 7 | 8 | 9 |
|---|---|---|---|---|---|---|---|---|---|---|---|
| | Characteristic sequence | | | | | | Sending | | | | Monitoring |
| TDD system 1 | DDDSU (10:2:2) | D | D | D | | U | D | D | D | S | U |
| TDD system 2 | DDDSUUDDDD (6:4:4) | D | D | D | S | U | U | D | D | D | D |
| | Characteristic sequence | | | | | | Monitoring | | | | Sending |

The first characteristic sequence represents device information and an interference management reference signal of the network device in the second TDD system. The device information of the network device in the second TDD system may include identification information of the network device in the second TDD system and geographic position information of the network device in the second TDD system. The interference management reference signal may include a voltage signal.

The first characteristic sequence represents the device information, such as the device identification information, of the network device in the second TDD system. Therefore, when receiving the first characteristic sequence in the first radio frame, the network device in the first TDD system can learn that the first characteristic sequence is sent by the second TDD system in the second radio frame. As shown in FIG. 4, the second TDD system sends the first characteristic sequence in the tenth subframe in the second radio frame.

Step 4012: The network device in the first TDD system monitors, based on the device information and the interference management reference signal, an average interference value corresponding to the first characteristic sequence.

It should be understood as that, the average interference value corresponding to the first characteristic sequence is obtained by the network device in the first TDD system through monitoring based on the device information and the interference management reference signal of the second TDD system in the second radio frame. For example, the network device in the first TDD system determines signal strength of the received first characteristic sequence based on the identification information, the geographical position information, and the voltage signal of the network device in the second TDD system, and determines the average interference value corresponding to the first characteristic sequence based on the signal strength of the first characteristic sequence.

Step 4013: Perform step 401 when the average interference value corresponding to the first characteristic sequence detected by the network device in the first TDD system is greater than a first threshold.

The first threshold may be set as required. This is not limited. For example, the first threshold may be −102 dB.

Figure 4B:
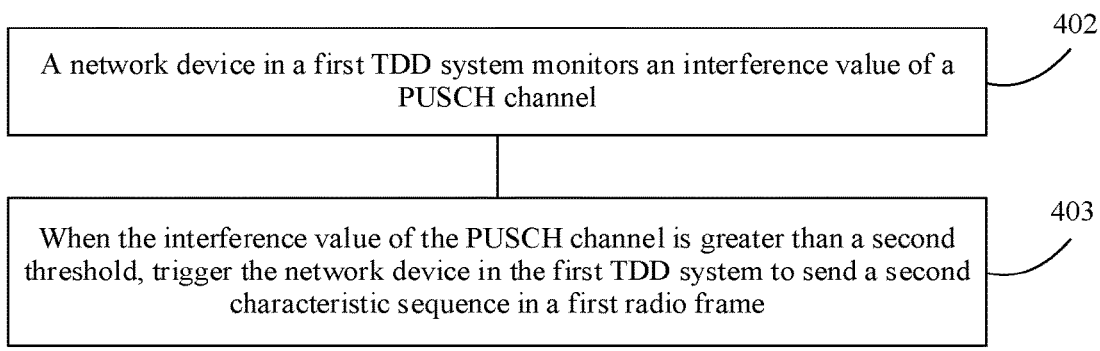
FIG. 4b is a flowchart of another interference coordination method according to an embodiment of this application.

In an embodiment, as shown in FIG. 4b, the interference coordination method provided in this embodiment of this application may further include the following steps.

user equipment UE in the second slot in the second radio frame by using the second specified frequency domain resource.

For example, as shown in FIG. 4, the network device in the first TDD system sends the second characteristic sequence in the sixth subframe in the first radio frame.

FIG. 5 shows an interference coordination method provided in an embodiment of this application. The method is applied to a communication system including a first TDD system and a second TDD system, where the first TDD system uses a first slot configuration. As shown in FIG. 5, the method may include the following steps.

Step 501: When communicating with UE in a first slot in a first radio frame, a network device in the first TDD system skips scheduling a logical channel in the first slot or a symbol in the first slot, and modifies a slot configuration of a third slot corresponding to the first slot, where a modified slot configuration of the third slot is different from the first slot configuration.

The first slot configuration may be an association relationship preconfigured for each slot of the network device in the first TDD system. As shown in Table 2, a downlink slot of the first subframe is associated with an uplink slot of the fifth subframe, a downlink slot of the second subframe is associated with an uplink slot of the fifth subframe, and a sixth subframe (namely, the first slot) is associated with a tenth subframe (namely, the third slot).

A time domain position of the first slot in the first radio frame is the same as a time domain position of a second slot in a second radio frame, the second slot is a slot in which a network device in the second TDD system communicates with the UE in the second radio frame, and the first slot and the second slot have different functions.

That the first slot and the second slot have different functions is specifically as follows.

The first slot is used by the network device in the first TDD system to receive, in the first slot, an uplink signal sent by the UE, and the second slot is used by the network device in the second TDD system to send a downlink signal to the UE in the second slot; or the first slot is used by the network device in the first TDD system to send a downlink signal to the UE in the first slot, and the second slot is used by the network device in the second TDD system to receive, in the second slot, an uplink signal sent by the UE. A specific example is as described above.

Step 502: The network device in the first TDD system communicates with the UE in other slots by using the first slot configuration, where the other slots are slots in the first radio frame other than the first slot and the third slot.

To avoid interference, time sequence adjustment may be performed on a slot that is in the first slot and that is used to transmit an uplink signal or a downlink signal. Specifically, step 501 may be implemented in the following two manners.

Manner 1: The performing time sequence adjustment on a slot that is in the first slot and that is used to transmit a downlink signal may be specifically implemented as that: When communicating with UE in a first slot in a first radio frame, the network device in the first TDD system skips scheduling a logical channel in a downlink slot in the first slot or a symbol in the downlink slot, and modifies a slot configuration of a third slot corresponding to the downlink slot in the first slot, where a modified slot configuration of the third slot is different from the first slot configuration.

Example 2: It is assumed that a length of a downlink slot DwPTS may be configured as 4 or 14 OFDM symbols. As shown in FIG. 5, when communicating with the UE in the first slot in the first radio frame, the network device in the first TDD system skips scheduling a logical channel in the downlink slot in the fourth subframe in the first slot or a symbol in the downlink slot, and modifies a slot configuration of a slot in the ninth subframe corresponding to the downlink slot in the fourth subframe in the first slot. In other words, when communicating with the UE in the first slot in the first radio frame, the network device in the first TDD system skips scheduling a logical channel in the downlink slot in the fourth subframe in the first slot or a symbol in the downlink slot, removes an association relationship between the downlink slot in the fourth subframe and a slot in the eighth subframe, and configures the slot in the eighth subframe with a slot other than the first slot, for example, a slot in the third subframe.

Similarly, as shown in FIG. 5, when communicating with the UE in the first slot in the first radio frame, the network device in the first TDD system skips scheduling a logical channel in the downlink slot in the sixth subframe in the first slot or a symbol in the downlink slot, and modifies a slot configuration of a slot in the tenth subframe corresponding to the downlink slot in the sixth subframe in the first slot. In other words, alternatively, when communicating with the UE in the first slot in the first radio frame, the network device in the first TDD system skips scheduling a logical channel in the downlink slot in the sixth subframe in the first slot or a symbol in the downlink slot, removes an association relationship between the downlink slot in the sixth subframe and a slot in the tenth subframe, and configures the slot in the tenth subframe with a slot other than the first slot, for example, a slot in the third subframe.

subframe, and receives, in the uplink slot in the fifth subframe, an uplink signal sent by the UE.

Through verification, it is obtained that spectrum utilization of the network device in the first TDD system 1 is (8*14*100+1*10*100)/10*14*50=174%, and spectrum utilization of the network device in the second TDD system 2 is (8*14*100+1*10*100)/10*14*50=174%. It can be learned that the spectrum utilization of the first TDD system 1 and the second TDD system 2 are both improved.

Manner 2: The performing time sequence adjustment on a slot that is in the first slot and that is used to transmit an uplink signal may be specifically implemented as that:

When communicating with UE in a first slot in a first radio frame, the network device in the first TDD system skips scheduling a logical channel in an uplink slot in the first slot or a symbol in the uplink slot, and modifies a slot configuration of a third slot corresponding to the uplink slot in the first slot, where a modified slot configuration of the third slot is different from the first slot configuration.

Figure 6:
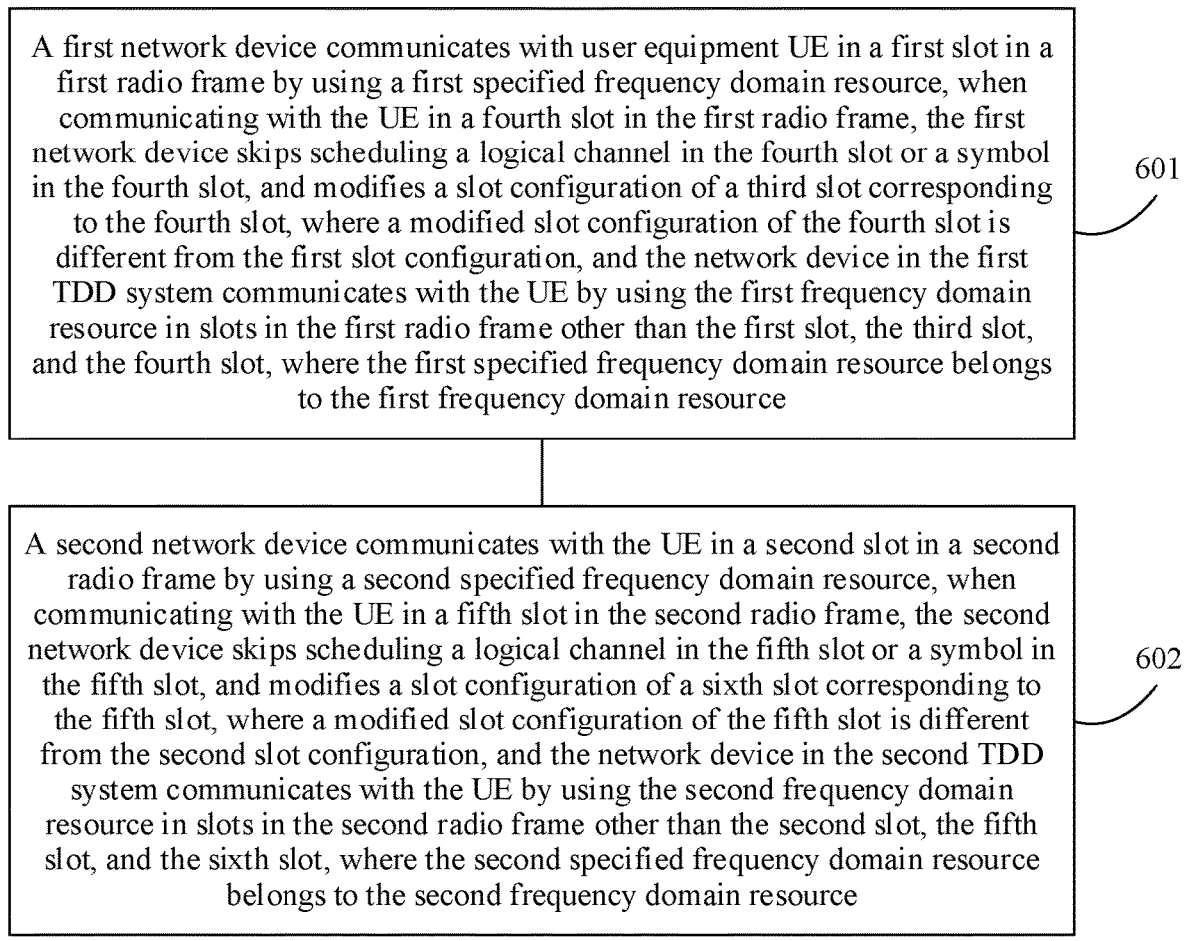
FIG. 6 is a flowchart of another communication method according to an embodiment of this application.

Example 3: It is assumed that a length of an uplink slot UpPTS may be configured as 2 or 14 OFDM symbols. As shown in FIG. 6, when communicating with the UE in the first slot in the first radio frame, the network device in the first TDD system skips scheduling a logical channel in the uplink slot in the ninth subframe in the first slot or a symbol in the uplink slot, and modifies a slot configuration of the downlink slot in the fourth subframe corresponding to the uplink slot in the ninth subframe in the first slot. In other words, when communicating with the UE in the first slot in the first radio frame, the network device in the first TDD system skips scheduling a logical channel in the uplink slot in the ninth subframe in the first slot or a symbol in the uplink slot, removes an association relationship between the uplink slot in the ninth subframe and the downlink slot in the fourth subframe, and configures the downlink slot in the fourth subframe with a slot other than the first slot, for example, a slot in a next radio frame.

Similarly, as shown in FIG. 6, when communicating with the UE in the first slot in the first radio frame, the network device in the first TDD system skips scheduling a logical channel in the uplink slot in the tenth subframe in the first slot or a symbol in the uplink slot, and modifies a slot configuration of the downlink slot in the sixth subframe corresponding to the uplink slot in the tenth subframe in the first slot. In other words, alternatively, when communicating with the UE in the first slot in the first radio frame, the network device in the first TDD system skips scheduling a logical channel in the uplink slot in the tenth subframe in the

TABLE 5

| | Slot assignment | 0 | 1 | 2 | 3 | 4 | 5 | 6 | 7 | 8 | 9 |
|---|---|---|---|---|---|---|---|---|---|---|---|
| TDD system 1 | Downlink timing adaptation | | | | | 4 | 14 | | | | |
| | DDDSU (10:2:2) | D | D | D | | U | D | D | D | S | U |
| TDD system 2 | DDDSUUDDDD (6:4:4) | D | D | D | S | U | U | D | D | D | D |
| | Downlink timing adaptation | | | | | | | | | 4 | 14 |

In addition, to improve spectrum utilization, the network device in the first TDD system communicates with the UE in other slots by using the first slot configuration. For example, the network device in the first TDD system sends a downlink signal to the UE in the downlink slot in the first first slot or a symbol in the uplink slot, removes an association relationship between the downlink slot in the sixth subframe and a slot in the tenth subframe, and configures the downlink slot in the sixth subframe with a slot other than the first slot, for example, a slot in a next radio subframe.

TABLE 6

| | Slot assignment slot | 0 | 1 | 2 | 3 | 4 | 5 | 6 | 7 | 8 | 9 |
|---|---|---|---|---|---|---|---|---|---|---|---|
| TDD system 1 | Uplink timing adaptation | | | | | | | | | 2 | 14 |
| | DDDSU (10:2:2) | D | D | D | S | U | D | D | D | | U |
| TDD system 2 | DDDSUUDDDD (6:4:4) | D | D | D | | U | U | D | D | D | D |
| | Uplink timing adaptation | | | | | 2 | 14 | | | | |

In addition, to improve spectrum utilization, the network device in the first TDD system communicates with the UE in other slots by using the first slot configuration. For example, the network device in the first TDD system sends a downlink signal to the UE in the downlink slot in the second subframe, and receives, in the uplink slot in the fifth subframe, an uplink signal sent by the UE.

Through verification, it is obtained that spectrum utilization of the network device in the first TDD system 1 is $(8*14*100+1*12*100)/10*14*50=177\%$, and spectrum utilization of the network device in the second TDD system 2 is $(8*14*100+1*12*100)/10*14*50=177\%$. It can be learned that the spectrum utilization of the first TDD system 1 and the second TDD system 2 are both improved.

In an embodiment, as shown in FIG. 5a, step 501 may be specifically implemented as follows.

Step 5011: The network device in the first TDD system receives, in the first radio frame, a first characteristic sequence sent by the network device in the second TDD system.

The network device in the first TDD system may receive, in a subframe in the first radio frame, the first characteristic sequence sent by the network device in the second TDD system. A specific subframe in the first radio frame in which the network device in the first TDD system receives the first characteristic sequence sent by the network device in the second TDD system is not specifically limited in this application, provided that the network device in the first TDD system receives, in the first radio frame, the first characteristic sequence sent by the network device in the second TDD system.

Figure 7:
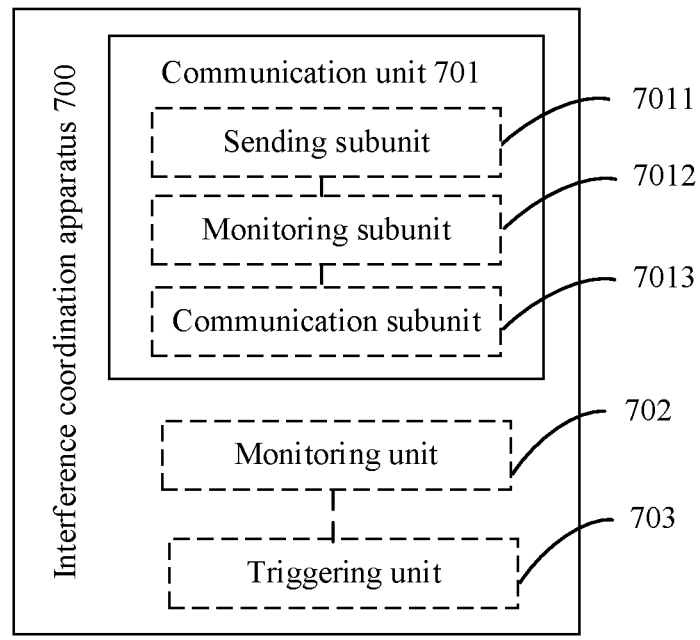
FIG. 7 is a schematic diagram of composition of an interference coordination apparatus according to an embodiment of this application.

For example, as shown in FIG. 7, the network device in the first TDD system receives, in the tenth subframe in the first radio frame, the first characteristic sequence sent by the network device in the second TDD system.

radio frame, the network device in the first TDD system can learn that the first characteristic sequence is sent by the second TDD system in the second radio frame. As shown in FIG. 7, the second TDD system sends the first characteristic sequence in the tenth subframe in the second radio frame.

Step 5012: The network device in the first TDD system monitors, based on the device information and the interference management reference signal, an average interference value corresponding to the first characteristic sequence.

It should be understood as that, the average interference value corresponding to the first characteristic sequence is obtained by the network device in the first TDD system through monitoring based on the device information and the interference management reference signal of the second TDD system in the second radio frame. For example, the network device in the first TDD system determines signal strength of the received first characteristic sequence based on the identification information, the geographical position information, and the voltage signal of the network device in the second TDD system, and determines the average interference value corresponding to the first characteristic sequence based on the signal strength of the first characteristic sequence.

Step 5013: Perform step 501 when the average interference value corresponding to the first characteristic sequence detected by the network device in the first TDD system is greater than a first threshold.

The first threshold may be set as required. This is not limited. For example, the first threshold may be −102 dB.

Figure 5B:
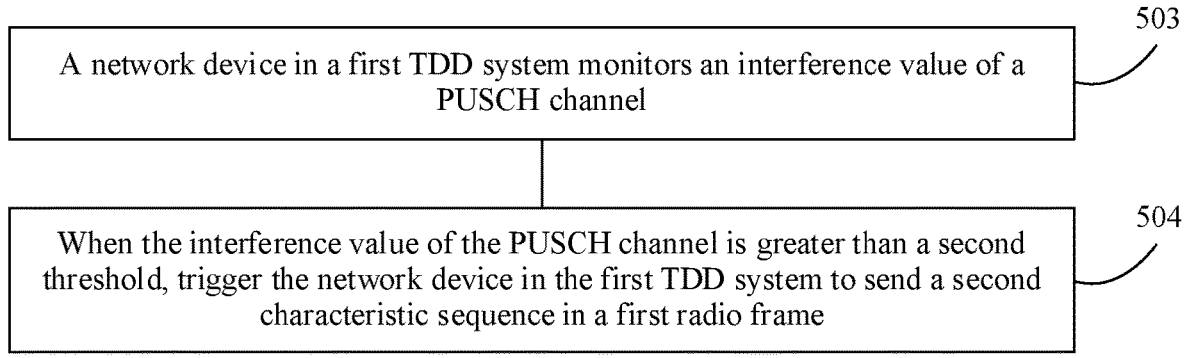
FIG. 5b is a flowchart of still another interference coordination method according to an embodiment of this application.

In an embodiment, as shown in FIG. 5b, the interference coordination method provided in this embodiment of this application may further include the following steps.

Step 503: The network device in the first TDD system monitors an interference value of a PUSCH channel.

TABLE 7

| | Slot assignment | 0 | 1 | 2 | 3 | 4 | 5 | 6 | 7 | 8 | 9 |
|---|---|---|---|---|---|---|---|---|---|---|---|
| TDD system 1 | Characteristic sequence | | | | | | Sending | | | | Monitoring |
| | DDDSU (10:2:2) | D | D | D | | U | D | D | D | S | U |
| TDD system 2 | DDDSUUDDDD (6:4:4) | D | D | D | S | U | U | D | D | D | D |
| | Characteristic sequence | | | | | | Monitoring | | | | Sending |

The first characteristic sequence represents device information and an interference management reference signal of the network device in the second TDD system. The device information of the network device in the second TDD system may include identification information of the network device in the second TDD system and geographic position information of the network device in the second TDD system. The interference management reference signal may include a voltage signal.

The first characteristic sequence represents the device information, such as the device identification information, of the network device in the second TDD system. Therefore, when receiving the first characteristic sequence in the first Step 504: When the interference value of the PUSCH channel is greater than a second threshold, trigger the network device in the first TDD system to send a second characteristic sequence in the first radio frame.

The second threshold may be set as required. This is not limited. For example, the second threshold may be −107 dB.

The second characteristic sequence triggers the network device in the second TDD system to communicate with the user equipment UE in the second slot in the second radio frame by using the modified slot configuration.

For example, as shown in FIG. 7, the network device in the first TDD system sends the second characteristic sequence in the sixth subframe in the first radio frame.

It should be added herein that the interference coordination method provided in this embodiment of this application is applied to a geographical boundary between the first TDD system and the second TDD system. The network device in the first TDD system communicates with the UE in the first slot by using the first specified frequency domain resource and/or the modified slot configuration, and the network device in the second TDD system communicates with the UE in the second slot by using the second specified frequency domain resource and/or the modified slot configuration. The first specified frequency domain resource is different from the second specified frequency domain resource, the first slot and the second slot have a same slot position and different functions, so that in slots that have a same slot position and different functions, the network device in the first TDD system and the network device in the second TDD system perform inter-frequency processing in frequency domain and/or perform slot configuration modification processing in time domain, and the network device in the first TDD system and the network device in the second TDD system do not perform adjustment in frequency domain and time domain in other slots, thereby effectively avoiding interference between the first TDD system and the second TDD system. In comparison with a method of avoiding interference by increasing a geographical distance between the first TDD system and the second TDD system, the method is easy to implement, and the costs are low, so that the neighboring asynchronous TDD systems achieve a win-win objective.

FIG. 6 shows an interference coordination method provided in an embodiment of this application. The method is applied to a communication system including a first TDD system and a second TDD system. The first TDD system uses a first frequency domain resource, the second TDD system uses a second frequency domain resource, and at least a part of frequency domain resources in the first frequency domain resource and a part of frequency domain resources in the second frequency domain resource are the same. The first TDD system uses a first slot configuration, and the second TDD system uses a second slot configuration. As shown in FIG. 6, the method may include the following steps.

Step 601: A first network device communicates with user equipment UE in a first slot in a first radio frame by using a first specified frequency domain resource, when communicating with the UE in a fourth slot in the first radio frame, the first network device skips scheduling a logical channel in the fourth slot or a symbol in the fourth slot, and modifies a slot configuration of a third slot corresponding to the fourth slot, where a modified slot configuration of the fourth slot is different from the first slot configuration, and the network device in the first TDD system communicates with the UE by using the first frequency domain resource in slots in the first radio frame other than the first slot, the third slot, and the fourth slot, where the first specified frequency domain resource belongs to the first frequency domain resource.

Step 602: A second network device communicates with the UE in a second slot in a second radio frame by using a second specified frequency domain resource, when communicating with the UE in a fifth slot in the second radio frame, the second network device skips scheduling a logical channel in the fifth slot or a symbol in the fifth slot, and modifies a slot configuration of a sixth slot corresponding to the fifth slot, where a modified slot configuration of the fifth slot is different from the second slot configuration, and the network device in the second TDD system communicates with the UE by using the second frequency domain resource in slots in the second radio frame other than the second slot, the fifth slot, and the sixth slot, where the second specified frequency domain resource belongs to the second frequency domain resource.

The first specified frequency domain resource is different from the second specified frequency domain resource, a time domain position of the first slot in the first radio frame is the same as a time domain position of the second slot in the second radio frame, and the first slot and the second slot have different functions.

To maximize frequency domain resource utilization, preferably, either of the first slot and the second slot is an uplink slot or a downlink slot, at least one of the third slot and the fourth slot is a special slot, and at least one of the fifth slot and the sixth slot is a special slot.

Example 4: As shown in Table 8, the foregoing example is still used. It is assumed that the first frequency domain resource and the second frequency domain resource are both 100 M, the first specified frequency domain resource is 50 M, and the second specified frequency domain resource is 50 M other than the first specified frequency domain resource.

The first network device communicates with the user equipment UE in a slot in the sixth subframe in the first radio frame by using the first specified frequency domain resource, when communicating with the UE in a downlink slot in the fourth subframe in the first radio frame, the first network device skips scheduling a logical channel in the downlink slot in the fourth subframe or a symbol in the downlink slot, and modifies a slot configuration of a third slot (an uplink slot of the eighth subframe) corresponding to the downlink slot in the fourth subframe, where a modified slot configuration of the downlink slot in the fourth subframe is different from the first slot configuration, and the network device in the first TDD system communicates with the UE by using the first frequency domain resource in slots in the first radio frame other than the slot in the fourth subframe, the slot in the sixth subframe, the slot in the sixth subframe, and the slot in the tenth subframe.

The second network device communicates with the UE in a slot in the sixth subframe in the second radio frame by using the second specified frequency domain resource, when communicating with the UE in a downlink slot in the ninth subframe in the second radio frame, the second network device skips scheduling a logical channel in the downlink slot in the ninth subframe in the fifth slot or a symbol in the downlink slot, and modifies a slot configuration of a sixth slot corresponding to the downlink slot in the ninth subframe, where a modified slot configuration of the downlink slot in the ninth subframe is different from the second slot configuration, and the network device in the second TDD system communicates with the UE by using the second frequency domain resource in slots in the second radio frame other than the slot in the fourth subframe, the slot in the sixth subframe, the slot in the sixth subframe, and the slot in the tenth subframe.

TABLE 8

| | Slot assignment | 0 | 1 | 2 | 3 | 4 | 5 | 6 | 7 | 8 | 9 |
|---|---|---|---|---|---|---|---|---|---|---|---|
| TDD system 1 | Downlink slot adaptation | | | | 4 | | | | | | |
| | Spectrum resource | | | | | | 50M | | | | 50M |
| | DDDSU (10:2:2) | D | D | D | S | U | D | D | D | S | U |
| TDD system 2 | DDDSUUDDDD (6:4:4) | D | D | D | S | U | U | D | D | D | D |
| | Spectrum resource | | | | | | 50M | | | | 50M |
| | Downlink slot adaptation | | | | | | | | | 4 | |

Through verification, it is obtained that spectrum utilization of the network device in the first TDD system 1 is (7*14*100+1*10*100+2*14*50)/10*14*50=174%, and spectrum utilization of the network device in the second TDD system 2 is (7*14*100+1*10*100+2*14*50)/10*14*50=174%. It can be learned that the spectrum utilization of the first TDD system 1 and the second TDD system 2 are both improved.

It is clear that the network device in the first TDD system communicates with the UE in the first slot by using the first specified frequency domain resource and/or the modified slot configuration. In this case, the network device in the second TDD system may communicate with the UE in the second slot by using the second frequency domain resource and/or the second slot configuration. It is clear that the network device in the second TDD system communicates with the UE in the second slot by using the second specified frequency domain resource and/or the modified slot configuration, and the network device in the first TDD system may communicate with the UE in the first slot by using the first frequency domain resource and/or the first slot configuration. In other words, the network device in the first TDD system and the network device in the second TDD system may be adjusted in time domain and/or frequency domain at the same time, or one of the network device in the first TDD system and the network device in the second TDD system may be adjusted in time domain and/or frequency domain. During specific implementation, selection needs to be performed based on an actual requirement. This is not specifically limited in this embodiment of this application.

FIG. 7 shows an interference coordination apparatus provided in an embodiment of this application. The apparatus is applied to a communication system including a first TDD system and a second TDD system. The first TDD system uses a first frequency domain resource, the second TDD system uses a second frequency domain resource, and at least a part of frequency domain resources in the first frequency domain resource and a part of frequency domain resources in the second frequency domain resource are the same. The apparatus 700 may include:

- a communication unit 701, configured to: communicate, by a network device in the first TDD system, with user equipment UE in a first slot in a first radio frame by using a first specified frequency domain resource, and communicate, by the network device in the first TDD system, with the UE in slots in the first radio frame other than the first slot by using the first frequency domain resource.

The first specified frequency domain resource belongs to the first frequency domain resource, the first specified frequency domain resource is different from a second specified frequency domain resource, the second specified frequency domain resource is a frequency domain resource used by a network device in the second TDD system to communicate with the UE in a second slot in a second radio frame, the second specified frequency domain resource belongs to the second frequency domain resource, a time domain position of the second slot in the second radio frame is the same as a time domain position of the first slot in the first radio frame, and the second slot and the first slot have different functions.

Further, that the second slot and the first slot have different functions is specifically as follows.

The first slot is used by the network device in the first TDD system to receive, in the first slot, an uplink signal sent by the UE; and the second slot is used by the network device in the second TDD system to send a downlink signal to the UE in the second slot.

Alternatively, the first slot is used by the network device in the first TDD system to send a downlink signal to the UE in the first slot; and the second slot is used by the network device in the second TDD system to receive, in the second slot, an uplink signal sent by the UE.

Further, the communication unit 701 may include:

- a sending subunit 7011, configured to: receive, by the network device in the first TDD system in the first radio frame, a first characteristic sequence sent by the network device in the second TDD system, where the first characteristic sequence represents device information and an interference management reference signal of the network device in the second TDD system;
- a monitoring subunit 7012, configured to: monitor, by the network device in the first TDD system based on the device information and the interference management reference signal, an average interference value corresponding to the first characteristic sequence; and
- a communication subunit 7013, configured to: communicate, by the network device in the first TDD system when the average interference value corresponding to the first characteristic sequence is greater than a first threshold, with the user equipment UE in the first slot in the first radio frame by using the first specified frequency domain resource.

Further, the apparatus 700 may further include:

- a monitoring unit 702, configured to: monitor, by the network device in the first TDD system, an interference value of a PUSCH channel; and
- a triggering unit 703, configured to: trigger, when the interference value of the PUSCH channel is greater than a second threshold, the network device in the first TDD system to send a second characteristic sequence in the first slot in the first radio frame, where the second characteristic sequence triggers the network device in the second TDD system to communicate with the user equipment UE in the second slot in the second radio frame by using the second specified frequency domain resource.

Specifically, in the possible design, all related content of the steps related to the network device in the first TDD system in the method embodiments shown in FIG. 4 to FIG.

4b may be referenced to function descriptions of corresponding functional modules. Details are not described herein again. The interference coordination apparatus 700 in the possible design is configured to perform functions of the network device in the first TDD system in the interference coordination method shown in FIG. 4 to FIG. 4b. Therefore, the interference coordination apparatus 700 can achieve an effect the same as that achieved by the foregoing interference coordination method.

Figure 8:
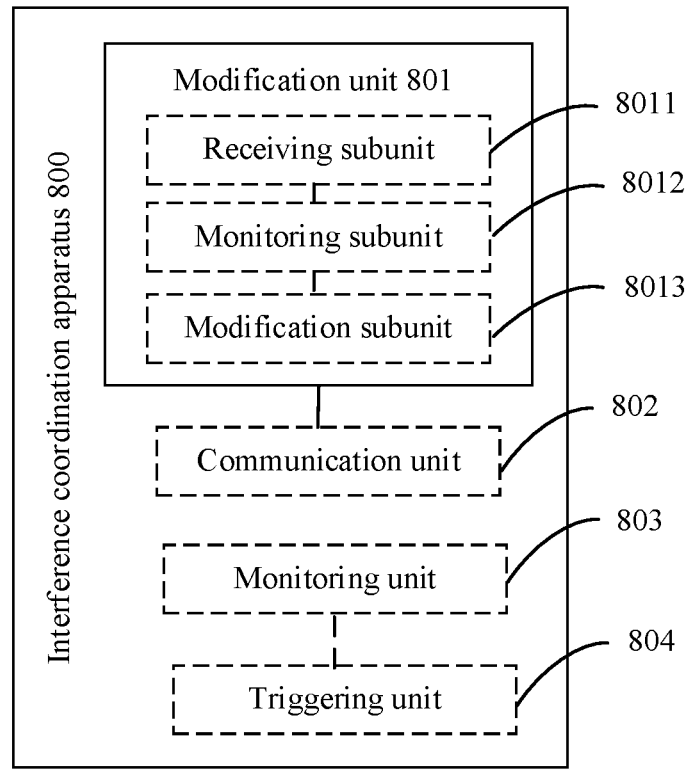
FIG. 8 is a schematic diagram of composition of another interference coordination apparatus according to an embodiment of this application.

FIG. 8 shows an interference coordination apparatus provided in an embodiment of this application. The apparatus is applied to a communication system including a first TDD system and a second TDD system, where the first TDD system uses a first slot configuration. The apparatus 800 may include:
  a modification unit 801, configured to: skip, by a network device in the first TDD system when communicating with UE in a first slot in a first radio frame, scheduling a logical channel in the first slot or a symbol in the first slot, and modify a slot configuration of a third slot corresponding to the first slot, where a modified slot configuration of the third slot is different from the first slot configuration; and
  a communication unit 802, configured to: communicate, by the network device in the first TDD system, with the UE in other slots by using the first slot configuration, where the other slots are slots in the first radio frame other than the first slot and the third slot.

A time domain position of the first slot in the first radio frame is the same as a time domain position of a second slot in a second radio frame, the second slot is a slot in which a network device in the second TDD system communicates with the UE in the second radio frame, and the first slot and the second slot have different functions.

Further, that the second slot and the first slot have different functions is specifically as follows.

The first slot is used by the network device in the first TDD system to receive, in the first slot, an uplink signal sent by the UE; and the second slot is used by the network device in the second TDD system to send a downlink signal to the UE in the second slot.

Alternatively, the first slot is used by the network device in the first TDD system to send a downlink signal to the UE in the first slot; and the second slot is used by the network device in the second TDD system to receive, in the second slot, an uplink signal sent by the UE.

Further, the modification unit 801 includes:
  a receiving subunit 8011, configured to: receive, by the network device in the first TDD system in the first slot in the first radio frame, a first characteristic sequence sent by the network device in the second TDD system, where the first characteristic sequence represents device information and an interference management reference signal of the network device in the second TDD system;
  a monitoring subunit 8012, configured to: monitor, by the network device in the first TDD system based on the device information and the interference management reference signal, an average interference value corresponding to the first characteristic sequence; and
  a modifying subunit 8013, configured to: skip, by the network device in the first TDD system when communicating with the UE in the first slot in the first radio frame and when the average interference value corresponding to the first characteristic sequence is greater than a first threshold, scheduling a logical channel in the first slot or a symbol in the first slot, and modify a slot configuration of a third slot corresponding to the first slot.

Further, the apparatus 800 may include:
  a monitoring unit 803, configured to: monitor, by the network device in the first TDD system, an interference value of a PUSCH channel; and
  a triggering unit 804, configured to: trigger, when the interference value of the PUSCH channel is greater than a second threshold, the network device in the first TDD system to send a second characteristic sequence in the first radio frame, where the second characteristic sequence triggers the network device in the second TDD system to communicate with the user equipment UE in the second slot in the second radio frame by using the modified slot configuration.

Specifically, in the possible design, all related content of the steps related to the network device in the first TDD system in the method embodiments shown in FIG. 5 to FIG. 5b may be referenced to function descriptions of corresponding functional modules. Details are not described herein again. The interference coordination apparatus 800 in the possible design is configured to perform functions of the network device in the first TDD system in the interference coordination method shown in FIG. 5 to FIG. 5b. Therefore, the interference coordination apparatus 800 can achieve an effect the same as that achieved by the foregoing interference coordination method.

Figure 9:
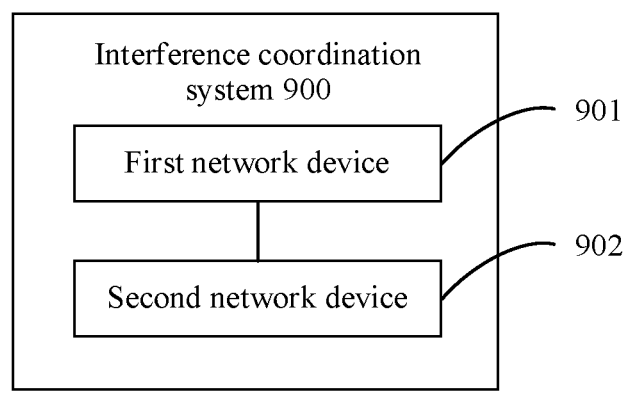
FIG. 9 is a schematic diagram of composition of an interference coordination system according to an embodiment of this application.

FIG. 9 shows an interference coordination system provided in an embodiment of this application. The system includes a first network device 901 and a second network device 902, where the first network device 901 uses a first frequency domain resource, the second network device 902 uses a second frequency domain resource, and at least a part of frequency domain resources in the first frequency domain resource and a part of frequency domain resources in the second frequency domain resource are the same. The system 900 includes:
  the first network device 901, configured to: communicate with user equipment UE in a first slot in a first radio frame by using a first specified frequency domain resource, and communicate with the UE in slots in the first radio frame other than the first slot by using the first frequency domain resource, where the first specified frequency domain resource belongs to the first frequency domain resource; and
  the second network device 902, configured to: communicate with the UE in a second slot in a second radio frame by using a second specified frequency domain resource, and communicate with the UE in slots in the second radio frame other than the second slot by using the second frequency domain resource, where the second specified frequency domain resource belongs to the second frequency domain resource.

The first specified frequency domain resource is different from the second specified frequency domain resource, a time domain position of the first slot in the first radio frame is the same as a time domain position of the second slot in the second radio frame, and the first slot and the second slot have different functions.

Figure 10:
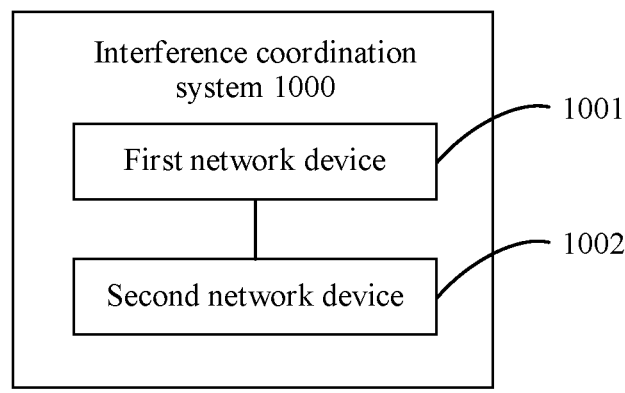
FIG. 10 is a schematic diagram of composition of another interference coordination system according to an embodiment of this application.

FIG. 10 shows an interference coordination system provided in an embodiment of this application. The system includes a first network device 1001 and a second network device 1002, where the first network device 1001 uses a first slot configuration, and the second network device 1002 uses a second slot configuration. The system 1000 includes:

the first network device 1001, configured to: skip, when communicating with UE in a first slot in a first radio frame, scheduling a logical channel in the first slot or a symbol in the first slot, and modify a slot configuration of a third slot corresponding to the first slot, where a modified slot configuration of the third slot is different from the first slot configuration;

the first network device 1001, configured to: communicate with the UE in first other slots by using the first slot configuration, where the first other slots are slots in the first radio frame other than the first slot and the third slot;

the second network device 1002, configured to: skip, when communicating with the UE in a second slot in a second radio frame, scheduling a logical channel in the second slot or a symbol in the second slot, and modify a slot configuration of a fourth slot corresponding to the second slot, where a modified slot configuration of the fourth slot is different from the second slot configuration; and the second network device 1002, configured to: communicate with the UE in second other slots by using the second slot configuration, where the second other slots are slots in the second radio frame other than the second slot and the fourth slot.

A time domain position of the first slot in the first radio frame is the same as a time domain position of the second slot in the second radio frame, and the first slot and the second slot have different functions. A time domain position of the third slot in the first radio frame is the same as a time domain position of the fourth slot in the second radio frame, and the third slot and the fourth slot have different functions.

An embodiment of this application provides a network device, including a processor and a memory. The memory is coupled to the processor, the memory is configured to store computer program code, and the computer program code includes computer instructions. When the processor reads the computer instructions from the memory, the network device is enabled to perform the interference coordination method shown in FIG. 4 to FIG. 4*b*.

An embodiment of this application provides a computer program product. When the computer program product runs on a computer, the computer is enabled to perform the interference coordination method shown in FIG. 4 to FIG. 4*b*.

An embodiment of this application provides a computer-readable storage medium, including computer instructions. When the computer instructions are run on a terminal, a network device is enabled to perform the interference coordination method shown in FIG. 4 to FIG. 4*b*.

An embodiment of this application provides a chip system, including one or more processors. When the one or more processors execute instructions, the one or more processors perform the interference coordination method shown in FIG. 4 to FIG. 4*b*.

An embodiment of this application provides a network device, including a processor and a memory. The memory is coupled to the processor, the memory is configured to store computer program code, and the computer program code includes computer instructions. When the processor reads the computer instructions from the memory, the network device is enabled to perform the interference coordination method shown in FIG. 5 to FIG. 5*b*.

An embodiment of this application provides a computer program product. When the computer program product runs on a computer, the computer is enabled to perform the interference coordination method shown in FIG. 5 to FIG. 5*b*.

An embodiment of this application provides a computer-readable storage medium, including computer instructions. When the computer instructions are run on a terminal, a network device is enabled to perform the interference coordination method shown in FIG. 5 to FIG. 5*b*.

An embodiment of this application provides a chip system, including one or more processors. When the one or more processors execute instructions, the one or more processors perform the interference coordination method shown in FIG. 5 to FIG. 5*b*.

Based on the descriptions of the foregoing implementations, a person skilled in the art can clearly understand that, for ease and brevity of description, division into the foregoing functional modules is merely used as an example for illustration. In actual application, the foregoing functions can be allocated to different functional modules and implemented as required. In other words, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected according to actual requirements to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the current technology, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
communicating, by a network device in a first time division duplex (TDD) system of a communication system, with a user equipment (UE) in a first slot in a first radio frame by using a first specified frequency domain resource,
wherein the communication system further includes a second TDD system, wherein the first TDD system uses a first frequency domain resource, the second TDD system uses a second frequency domain resource, and wherein at least a first part of frequency domain resources in the first frequency domain resource and a second part of frequency domain resources in the second frequency domain resource are the same;
communicating, by the network device in the first TDD system, with the UE in slots in the first radio frame other than the first slot by using the first frequency domain resource,
wherein the first specified frequency domain resource belongs to the first frequency domain resource, the first specified frequency domain resource is different from a second specified frequency domain resource, the second specified frequency domain resource is used by a second network device in the second TDD system to communicate with the UE in a second slot in a second radio frame, the second specified frequency domain resource belongs to the second frequency domain resource, a second time domain position of the second slot in the second radio frame is the same as a first time domain position of the first slot in the first radio frame, and the second slot and the first slot have different functions.

2. The method according to claim 1, wherein the second slot and the first slot have the different functions such that:
the first slot is used by the network device in the first TDD system to receive, in the first slot, an uplink signal sent by the UE, and the second slot is used by the second network device in the second TDD system to send a downlink signal to the UE in the second slot.

3. The method according to claim 1, wherein the second slot and the first slot have the different functions such that:
the first slot is used by the network device in the first TDD system to send a downlink signal to the UE in the first slot, and the second slot is used by the second network device in the second TDD system to receive, in the second slot, an uplink signal sent by the UE.

4. The method according to claim 1, wherein the communicating, by the network device in the first TDD system, with the UE in the first slot in the first radio frame by using the first specified frequency domain resource comprises:
receiving, by the network device in the first TDD system in the first radio frame, a first characteristic sequence sent by the second network device in the second TDD system, wherein the first characteristic sequence represents device information and an interference management reference signal of the second network device in the second TDD system.

5. The method according to claim 4, wherein the communicating, by the network device in the first TDD system, with the UE in the first slot in the first radio frame by using the first specified frequency domain resource further comprises:
monitoring, by the network device in the first TDD system based on the device information and the interference management reference signal, an average interference value corresponding to the first characteristic sequence; and
communicating, by the network device in the first TDD system when the average interference value corresponding to the first characteristic sequence is greater than a first threshold, with the UE in the first slot in the first radio frame by using the first specified frequency domain resource.

6. The method according to claim 1, further comprising:
monitoring, by the network device in the first TDD system, an interference value of a physical uplink shared channel (PUSCH) channel; and
triggering, when the interference value of the PUSCH is greater than a second threshold, the network device in the first TDD system to send a second characteristic sequence in the first slot in the first radio frame, wherein the second characteristic sequence triggers the second network device in the second TDD system to communicate with the UE in the second slot in the second radio frame by using the second specified frequency domain resource.

7. A method, comprising:
skipping, by a network device in a first time division duplex (TDD) system of a communication system when communicating with a user equipment (UE) in a first slot in a first radio frame, scheduling a logical channel in the first slot or a symbol in the first slot;
modifying a third slot configuration of a third slot corresponding to the first slot,
wherein a modified third slot configuration of the third slot is different from a first slot configuration used by the first TDD system, and wherein the communication system further including a second TDD system; and
communicating, by the network device in the first TDD system, with the UE in other slots by using the first slot configuration, wherein the other slots are in the first radio frame other than the first slot and the third slot,
wherein a first time domain position of the first slot in the first radio frame is the same as a second time domain position of a second slot in a second radio frame, wherein a second network device in the second TDD system communicates with the UE in the second slot in the second radio frame, and wherein the first slot and the second slot have different functions.

8. The method according to claim 7, wherein that the second slot and the first slot have the different functions such that:
the first slot is used by the network device in the first TDD system to receive, in the first slot, an uplink signal sent by the UE, and the second slot is used by the second network device in the second TDD system to send a downlink signal to the UE in the second slot.

9. The method according to claim 7, wherein that the second slot and the first slot have the different functions such that:
the first slot is used by the network device in the first TDD system to send a downlink signal to the UE in the first slot, and the second slot is used by the second network device in the second TDD system to receive, in the second slot, an uplink signal sent by the UE.

10. The method according to claim 7, the communicating with the UE in the first slot in the first radio frame comprises:
receiving, by the network device in the first TDD system in the first slot in the first radio frame, a first characteristic sequence sent by the second network device in the second TDD system, wherein the first characteristic sequence represents device information and an interference management reference signal of the second network device in the second TDD system; and
monitoring, by the network device in the first TDD system based on the device information and the interference management reference signal, an average interference value corresponding to the first characteristic sequence.

11. The method according to claim 10, the communicating with the UE in the first slot in the first radio frame further comprises:
skipping, by the network device in the first TDD system when communicating with the UE in the first slot in the first radio frame and when the average interference value corresponding to the first characteristic sequence is greater than a first threshold, scheduling the logical channel in the first slot or the symbol in the first slot; and
modifying the third slot configuration of the third slot corresponding to the first slot.

12. The method according to claim 7, further comprising:
monitoring, by the network device in the first TDD system, an interference value of a physical uplink shared channel (PUSCH); and
triggering, when the interference value of the PUSCH is greater than a second threshold, the network device in the first TDD system to send a second characteristic sequence in the first radio frame, wherein the second characteristic sequence triggers the second network device in the second TDD system to communicate with the UE in the second slot in the second radio frame by using the modified third slot configuration.

13. A method, comprising:
communicating, by a network device in a first time division duplex (TDD) system of a communication system, with a user equipment (UE) in a first slot in a first radio frame by using a first specified frequency domain resource,
wherein the communication system further includes a second TDD system, the first TDD system uses a first frequency domain resource, the second TDD system uses a second frequency domain resource, at least a first part of frequency domain resources in the first frequency domain resource and a second part of frequency domain resources in the second frequency domain resource are the same, the first TDD system uses a first slot configuration, and the second TDD system uses a second slot configuration;
skipping, by the network device in the first TDD system when communicating with the UE in a fourth slot in the first radio frame, scheduling a logical channel in the fourth slot or a symbol in the fourth slot;
modifying a third slot configuration of a third slot corresponding to the fourth slot,
wherein the modified third slot configuration of the fourth slot is different from the first slot configuration;
communicating, by the network device in the first TDD system, with the UE by using the first frequency domain resource in first slots in the first radio frame other than the first slot, the third slot, and the fourth slot, wherein the first specified frequency domain resource belongs to the first frequency domain resource;
communicating, by a second network device in the second TDD system, with the UE in a second slot in a second radio frame by using a second specified frequency domain resource;
skipping, by the second network device in the second TDD system when communicating with the UE in a fifth slot in the second radio frame, scheduling a fifth logical channel in the fifth slot or a fifth symbol in the fifth slot;
modifying a sixth slot configuration of a sixth slot corresponding to the fifth slot, wherein a modified fifth slot configuration of the fifth slot is different from the second slot configuration; and
communicating, by the second network device in the second TDD system, with the UE by using the second frequency domain resource in second slots in the second radio frame other than the second slot, the fifth slot, and the sixth slot,
wherein the second specified frequency domain resource belongs to the second frequency domain resource,
wherein the first specified frequency domain resource is different from the second specified frequency domain resource, a first time domain position of the first slot in the first radio frame is the same as a second time domain position of the second slot in the second radio frame, and the first slot and the second slot have different functions.

14. The method according to claim 13, wherein that the second slot and the first slot have the different functions such that:
the first slot is used by the network device in the first TDD system to receive, in the first slot, an uplink signal sent by the UE, and the second slot is used by the second network device in the second TDD system to send a downlink signal to the UE in the second slot.

15. The method according to claim 13, wherein that the second slot and the first slot have the different functions such that:
the first slot is used by the network device in the first TDD system to send a downlink signal to the UE in the first slot, and the second slot is used by the second network device in the second TDD system to receive, in the second slot, an uplink signal sent by the UE.

16. The method according to claim 13, wherein the communicating, by the network device in the first TDD system, with the UE in the first slot in the first radio frame by using the first specified frequency domain resource comprises:
receiving, by the network device in the first TDD system in the first radio frame, a first characteristic sequence sent by the second network device in the second TDD system, wherein the first characteristic sequence represents device information and an interference management reference signal of the second network device in the second TDD system;
monitoring, by the network device in the first TDD system based on the device information and the interference management reference signal, an average interference value corresponding to the first characteristic sequence;
skipping, by the network device in the first TDD system when communicating with the UE in the first slot in the first radio frame and when the average interference value corresponding to the first characteristic sequence is greater than a first threshold, scheduling the logical channel in the first slot or the symbol in the first slot; and modifying the third slot configuration of the third slot corresponding to the first slot.

17. The method according to claim 13, wherein when the network device in the first TDD system communicates with the UE in the fourth slot in the first radio frame, the method comprises:

receiving, by the network device in the first TDD system in the first slot in the first radio frame, a first characteristic sequence sent by the second network device in the second TDD system, wherein the first characteristic sequence represents device information and an interference management reference signal of the second network device in the second TDD system;

monitoring, by the network device in the first TDD system based on the device information and the interference management reference signal, an average interference value corresponding to the first characteristic sequence;

skipping, by the network device in the first TDD system when communicating with the UE in the fourth slot in the first radio frame and when the average interference value corresponding to the first characteristic sequence is greater than a first threshold, scheduling a fourth logical channel in the fourth slot or a fourth symbol in the fourth slot; and modifying the third slot configuration of the third slot corresponding to the fourth slot.

18. The method according to claim 13, further comprising:

monitoring, by the network device in the first TDD system, an interference value of a PUSCH channel; and triggering, when the interference value of the PUSCH channel is greater than a second threshold, the network device in the first TDD system to send a second characteristic sequence in the first radio frame, wherein the second characteristic sequence triggers the second network device in the second TDD system to communicate with the UE in the second slot in the second radio frame by using the modified third slot configuration.

19. The method according to claim 13, comprising:

monitoring, by the network device in the first TDD system, an interference value of a physical uplink shared channel (PUSCH); and triggering, when the interference value of the PUSCH is greater than a second threshold, the network device in the first TDD system to send a second characteristic sequence in the first radio frame, wherein the second characteristic sequence triggers the second network device in the second TDD system to communicate with the UE in the second slot in the second radio frame by using the second specified frequency domain resource.

20. The method according to claim 13, wherein at least one of the third slot or the fourth slot is a special slot, and at least one of the fifth slot or the sixth slot is a second special slot.

* * * * *